(12) United States Patent
Kobilka et al.

(10) Patent No.: US 10,570,252 B2
(45) Date of Patent: Feb. 25, 2020

(54) FLAME RETARDANT LACTIDE MONOMORS FOR POLYLACTIDE SYNTHESIS

(71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 15/452,914

(22) Filed: Mar. 8, 2017

(65) Prior Publication Data

US 2018/0258218 A1    Sep. 13, 2018

(51) Int. Cl.
*C08G 63/08* (2006.01)
*C08L 67/04* (2006.01)
*C08G 63/692* (2006.01)

(52) U.S. Cl.
CPC ...... *C08G 63/6922* (2013.01); *C08L 2201/02* (2013.01)

(58) Field of Classification Search
CPC .. C08G 63/08; C08G 63/692; C08G 63/6922; C08L 67/04; C08L 2201/02
See application file for complete search history.

(56) References Cited

U.S. PATENT DOCUMENTS

| | | | |
|---|---|---|---|
| 4,065,428 A | 12/1977 | Deets | |
| 4,983,745 A | 1/1991 | Muller | |
| 4,994,587 A | 2/1991 | Notermann | |
| 5,137,953 A | 8/1992 | Fuhr et al. | |
| 5,852,117 A | 12/1998 | Schoenberg et al. | |
| 6,316,581 B1 | 11/2001 | Gross et al. | |
| 6,339,166 B1 | 1/2002 | Allcock et al. | |
| 6,740,731 B2 | 5/2004 | Bigg et al. | |
| 7,071,288 B2 | 7/2006 | Smith et al. | |
| 7,709,569 B2 | 5/2010 | Rafailovich et al. | |
| 8,741,877 B2 | 6/2014 | Moller et al. | |
| 9,029,497 B2 | 5/2015 | Li et al. | |
| 9,169,334 B2 | 10/2015 | Stewart et al. | |
| 9,187,597 B1 * | 11/2015 | Boday ................... | C08F 230/02 |
| 9,193,818 B1 | 11/2015 | Boday et al. | |
| 9,228,044 B2 | 1/2016 | Boday et al. | |
| 9,260,550 B1 | 2/2016 | Boday et al. | |
| 9,346,915 B2 | 5/2016 | Nemoto et al. | |
| 9,422,386 B2 | 8/2016 | Boday | |
| 9,534,116 B2 | 1/2017 | Zhu | |
| 10,035,877 B1 | 7/2018 | Kobilka | |
| 10,072,121 B1 | 9/2018 | Kobilka | |
| 10,202,489 B2 | 2/2019 | Kobilka | |
| 2005/0080223 A1 | 4/2005 | Tuominen | |
| 2006/0264573 A1 | 11/2006 | Bennett et al. | |
| 2006/0270779 A1 | 11/2006 | Mochizuki et al. | |
| 2008/0114132 A1 | 5/2008 | Daly et al. | |
| 2009/0054619 A1 | 2/2009 | Baker et al. | |
| 2009/0259000 A1 | 10/2009 | Urakami et al. | |
| 2009/0306333 A1 | 12/2009 | Jing et al. | |
| 2010/0028568 A1 * | 2/2010 | Weaver ................... | C08G 18/69 428/17 |
| 2013/0035429 A1 | 2/2013 | Tajima | |
| 2013/0302620 A1 | 11/2013 | Fenn et al. | |
| 2013/0317149 A1 | 11/2013 | Zhao | |
| 2014/0213732 A1 | 7/2014 | Stewart et al. | |
| 2015/0018493 A1 | 1/2015 | Mehrkhodavandi et al. | |
| 2015/0018497 A1 * | 1/2015 | Farrugia ............... | C08G 63/823 525/450 |
| 2015/0284506 A1 | 10/2015 | Boday et al. | |
| 2016/0215079 A1 | 7/2016 | Boday et al. | |
| 2017/0022320 A1 | 1/2017 | O'Hare | |
| 2018/0258218 A1 | 9/2018 | Kobilka | |
| 2019/0153153 A1 | 5/2019 | Kobilka | |

FOREIGN PATENT DOCUMENTS

| | | | | |
|---|---|---|---|---|
| CN | 101225224 | A | 7/2008 | |
| CN | 104371082 | A | 2/2015 | |
| EP | 0 765 889 | A1 | 4/1997 | |
| EP | 0 964 027 | B1 | 5/2004 | |
| EP | 2 013 288 | B1 | 2/2013 | |
| KR | 10-2011-0113947 | | 5/2013 | |
| WO | WO-90/01521 | A1 | 2/1990 | |
| WO | WO-03/027175 | A1 | 4/2003 | |
| WO | WO-2012/015128 | A1 | 2/2012 | |
| WO | WO-2012/169761 | A2 | 12/2012 | |
| WO | WO-2016/134178 | A1 | 8/2016 | |
| WO | WO-2016134178 | A1 * | 8/2016 | ......... C08G 63/6822 |

OTHER PUBLICATIONS

Morgan, et al. Flame Retardant Polymer Nanocomposites. pp. 7-8, Apr. 6, 2007 (Year: 2007).*
UL94 Specification, Jul. 10, 1998 (Year: 1998).*
Wright, et al. "Synthesis of Functionalized Poly(lactic acid) using 2-Bromo-3-hydroxypropionic acid", Macromolecules, 49, 2028-2038, Mar. 7, 2016. (Year: 2016).*
Gerhardt et al., *Functional Lactide Monomers: Methodology and Polymerization*, Biomacromolecules, vol. 7, No. 6, published on web May 24, 2006, pp. 1735-1742, American Chemical Society, Washington, D.C.
U.S. Appl. No. 15/452,996, to Brandon M. Kobilka et al., entitled, *Bottlebrush Polymers Derived From Poly(Methylidenelactide)*, assigned to International Business Machines Corporation, 23 pages, filed Mar. 8, 2017.
U.S. Appl. No. 15/453,104, to Brandon M. Kobilka et al., entitled, *Lactide Copolymers and Ring-Opened Lactide Copolymers*, assigned to International Business Machines Corporation, 24 pages, filed Mar. 8, 2017.
U.S. Appl. No. 15/452,880, to Brandon M. Kobilka et al., entitled, *Matrix-Bondable Lactide Monomors for Polylactide Synthesis*, assigned to International Business Machines Corporation, 39 pages, filed Mar. 8, 2017.

(Continued)

*Primary Examiner* — Christopher M Rodd
(74) *Attorney, Agent, or Firm* — Isaac J. Gooshaw

(57) ABSTRACT

A process of forming a flame retardant polylactide includes forming a flame retardant lactide monomer. The process also includes forming a lactide feedstock that includes at least the flame retardant lactide monomer. The process further includes polymerizing the lactide feedstock to form a flame retardant polylactide.

17 Claims, 9 Drawing Sheets

(56) References Cited

OTHER PUBLICATIONS

Fuoco et al., *A Route to Aliphatic Poly(ester)s with Thiol Pendant Groups: From Monomer Design to Editable Porous Scaffolds*, BioMACROMOLECULES, Feb. 2016, vol. 17, No. 4, pp. 1383-1394, American Chemical Society Publications, Washington, D.C.
Partlo III, *Reductively Degradable Polymeric Biomaterials*, Dissertation, Jan. 2015, 111 pages, University of Minnesota, USA.
Li et al., *Highly-effective Flame Retardancy of Poly(lactide) Composite Achieved Through Incorporation of Amorphous Nickel Phosphate Microparticle*, Polymer-Plastics Technology and Engineering, Aug. 2014, vol. 53, Issue 15, pp. 1533-1541, Taylor & Francis Group, an Informa Business, London.
Jing et al., *A Bifunctional Monomer Derived from Lactide for Toughening Polylactide*, Journal of the American Chemical Society (JACS) Communications, Sep. 2008, vol. 130, Issue 42, pp. 13826-13827, American Chemical Society Publications, Washington, D.C.
Appendix P; List of IBM Patent or Applications Treated as Related, Mar. 21, 2017, 2 pages.
Price et al., *Flame retardance of poly(methyl methacrylate) modified with phosphorus-containing compounds*, Polymer Degradation and Stability, Mar. 2002, vol. 77, Issue 2, pp. 227-233, Elsevier Science Ltd, Amsterdam, Netherlands.
*Altuglas International and NatureWorks Launch Worldwide Marketing Collaboration for New High Performance Alloys Incorporating Ingeo(TM) Biopolymers*, globenewswire.com (online), Dec. 11, 2012, 2 pages, URL: globenewswire.com/news-release/2012/12/11/510816/10015271/en/Altuglas-International-and-NatureWorks-Launch-Worldwide-Marketing-Collaboration-for-New-High-Performance-Alloys-Incorporating-Ingeo-TM-Biopolymers.html.
Mauldin et al., *An Acrylic Platform from Renewable Resources via a Paradigm Shift in Lactide Polymerization*, ACS Macro Letters, 2016, 5 (4), American Chemical Society, DOI: 10.1021/acsmacrolett.6b00023, Publication Date (Web): Apr. 8, 2016, 3 pages.
IBM, *IBM Academy of Technology Top 10 Technical Themes 2016*, IBM.com (online), accessed Jan. 16, 2017, 2 pages, URL: http://www-03.ibm.com/ibm/academy/tech/tech.shtml.
Verduzco et al., *Structure, function, self-assembly, and applications of bottlebrush copolymers*, Chemical Society Review, Feb. 2015, vol. 44, pp. 2405-2420, The Royal Society of Chemistry, UK.
Scheibelhoffer et al., *Synthesis, Polymerization and Copolymerization of Dimethyleneglycolide and Methylenemethylglycolide*, Polymer Preprints, vol. 10, No. 2, Sep. 1969, pp. 1375-1380, Division of Polymer Chemistry, American Chemical Society, Washington D.C.
Abayasinghe et al., *Terpolymers from Lactide and Bisphenol A Derivatives: Introducing Renewable Resource Monomers into Commodity Thermoplastics*, Macromolecules, vol. 36, No. 26, Dec. 2003, pp. 9681-9683, American Chemical Society, Washington, D.C.
Britner et al., *Self-Activation of Poly(methylenelactide) through Neighboring-Group Effects: A Sophisticated Type of Reactive Polymer*, Macromolecules, vol. 48, No. 11, May 2015, pp. 3516-3522, American Chemical Society, Washington, D.C.
Buffet et al., *Alkaline earth metal amide complexes containing a cyclen-derived (NNNN) macrocyclic ligand: synthesis, structure, and ring-opening polymerization activity towards lactide monomers*, New Journal of Chemistry, vol. 35, No. 10, Jul. 2011, pp. 2253-2257, Royal Society of Chemistry, London.
Noga et al., *Synthesis and Modification of Functional Poly(lactide) Copolymers: Toward Biofunctional Materials*, Biomacromolecules, vol. 9, No. 7, Jun. 2008, pp. 2056-2062, American Chemical Society, Washington, D.C.
Appendix P; List of IBM Patent or Applications Treated as Related, Jun. 1, 2017, 2 pages.
IBM Appendix P., "List of IBM Patents or Patent Applications to be Treated as Related", Dated Herewith, 2 pages.

\* cited by examiner

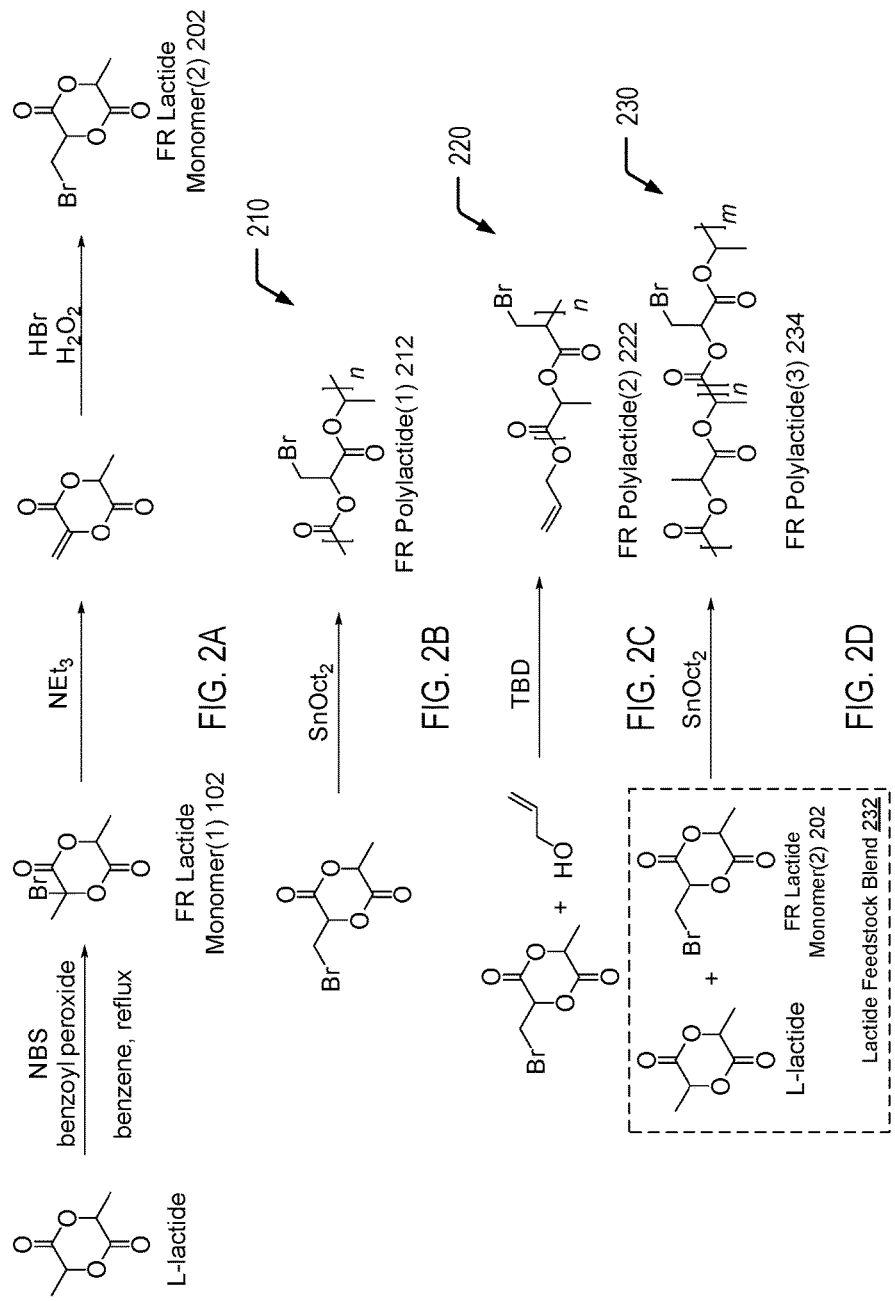

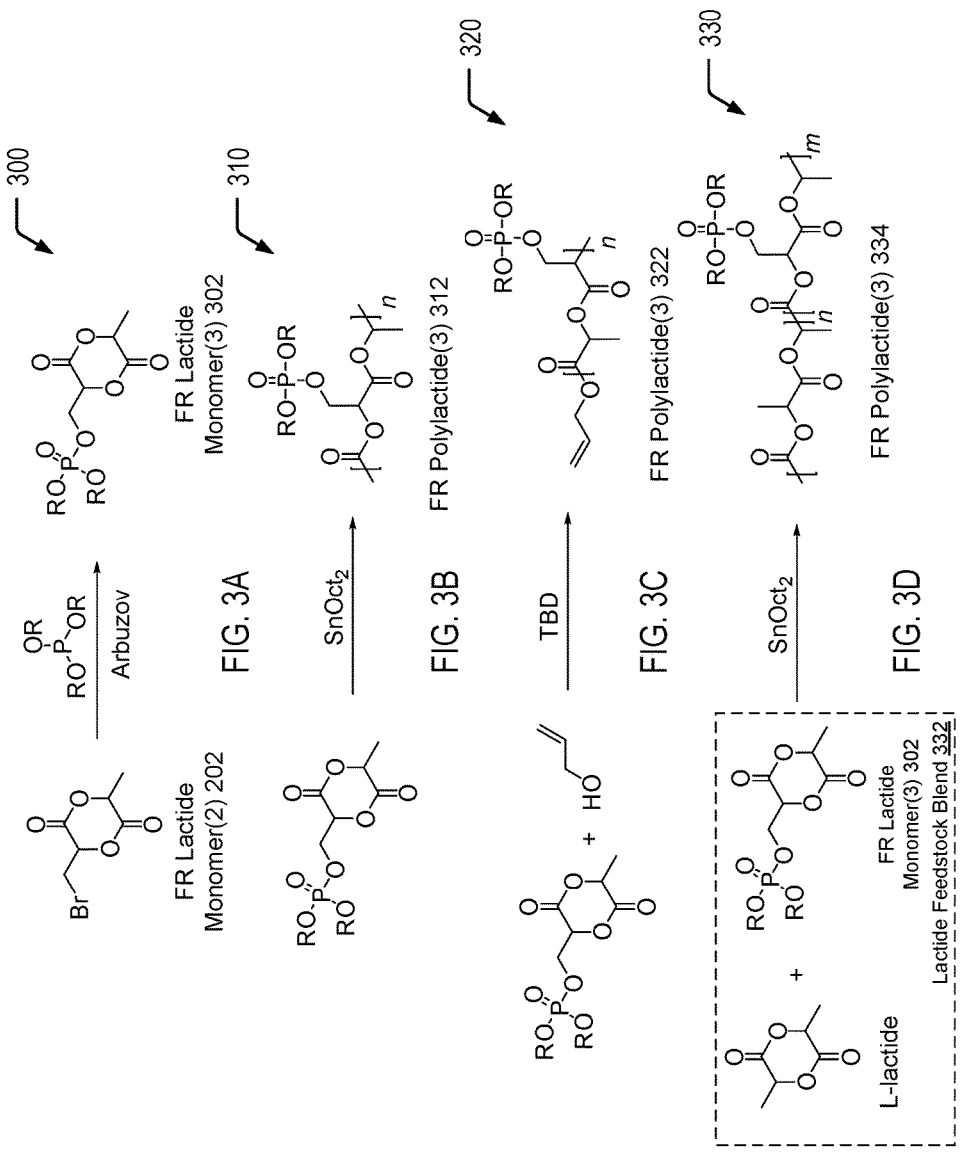

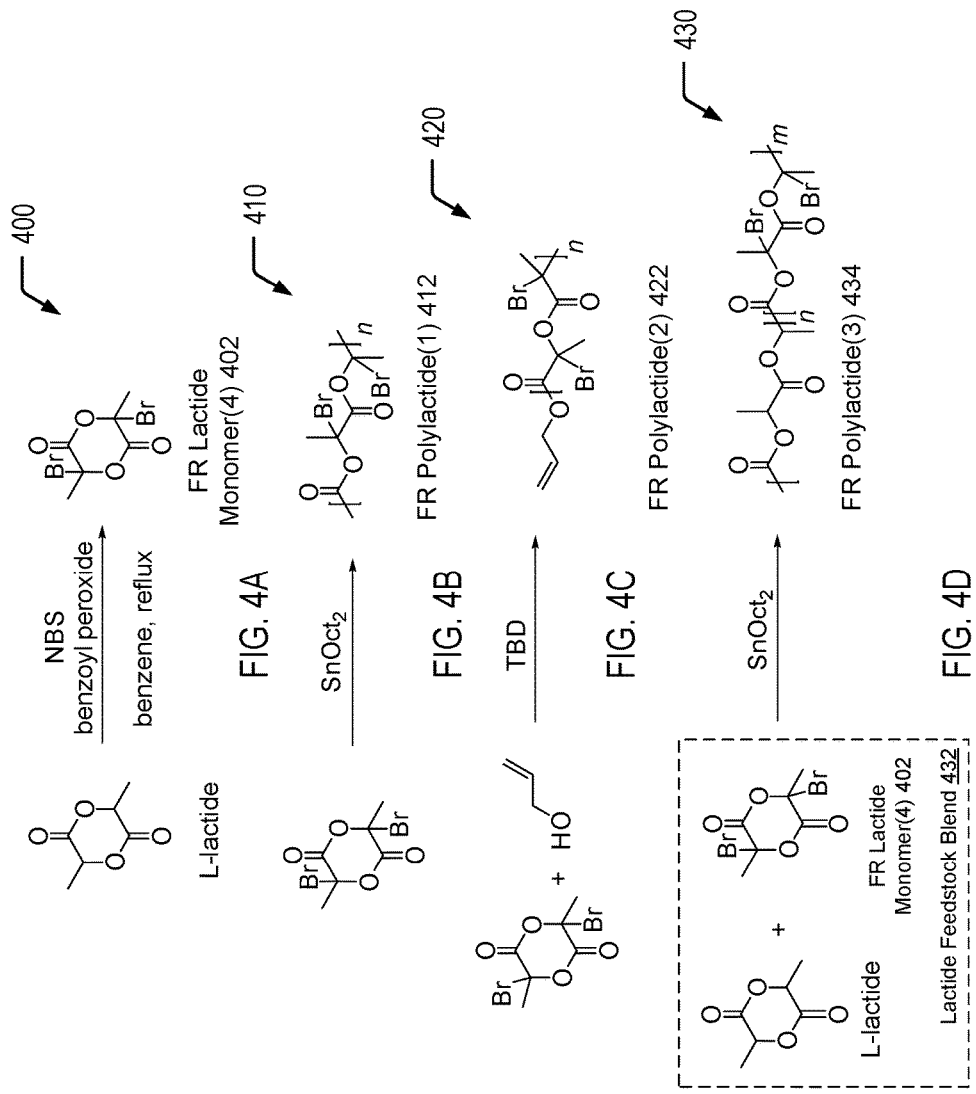

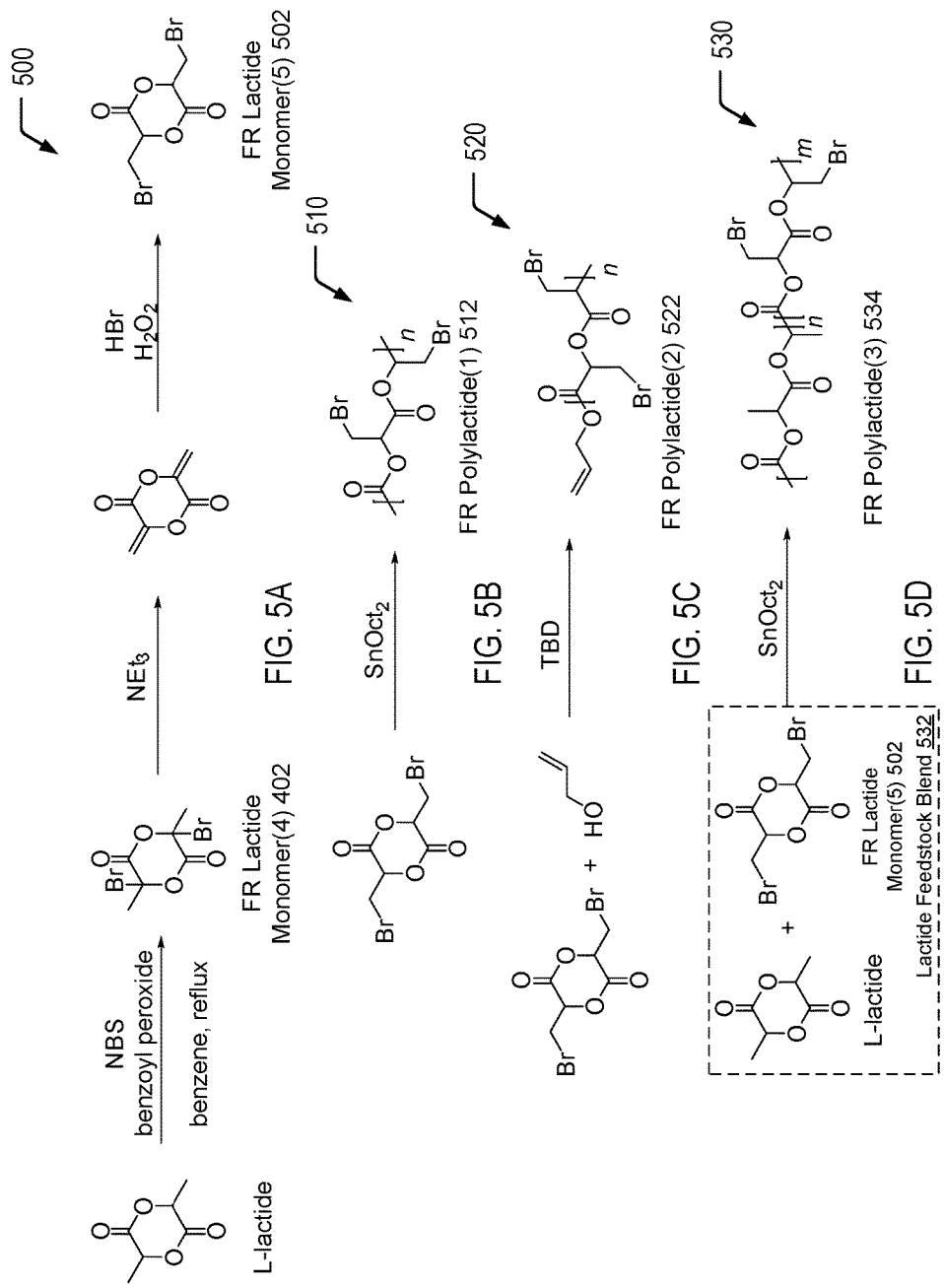

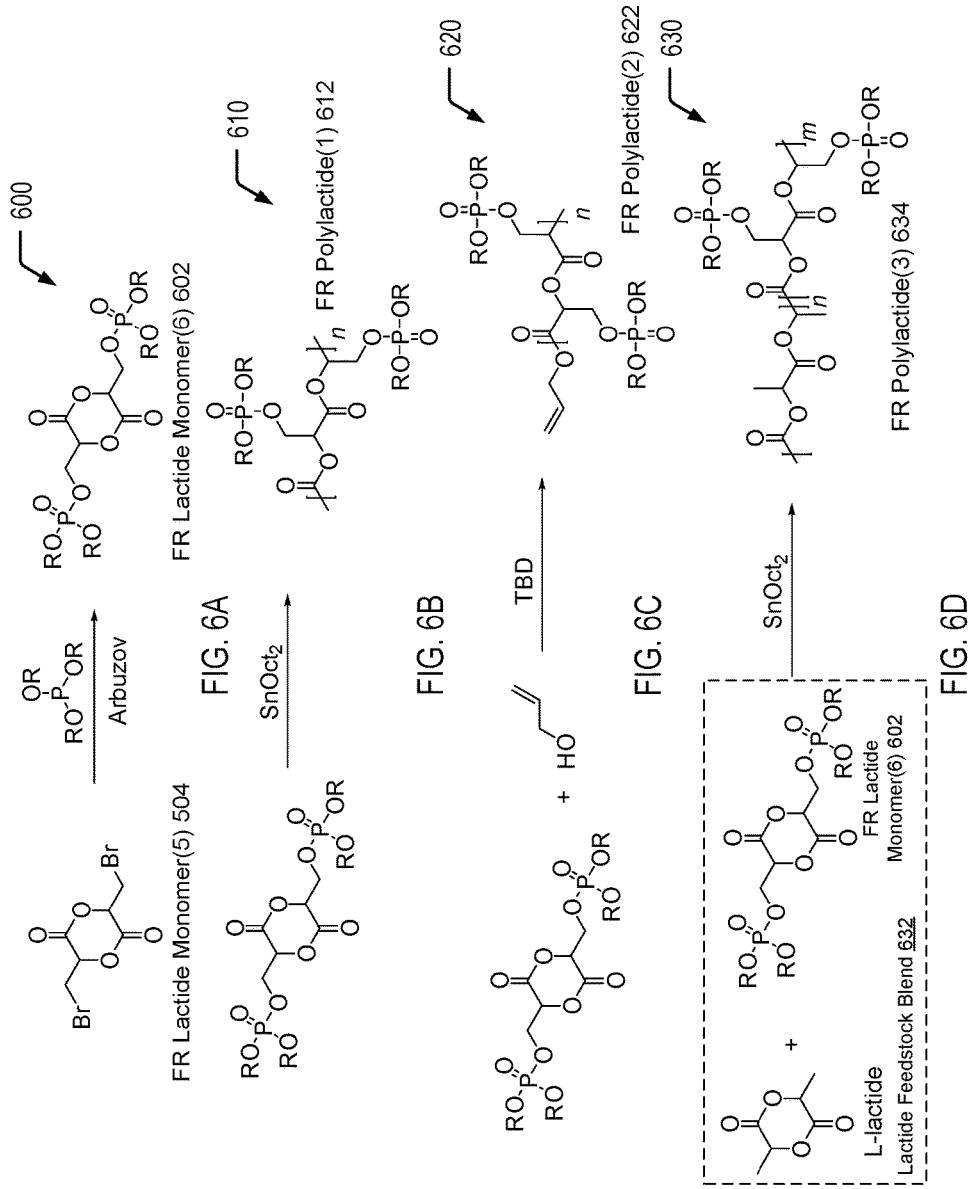

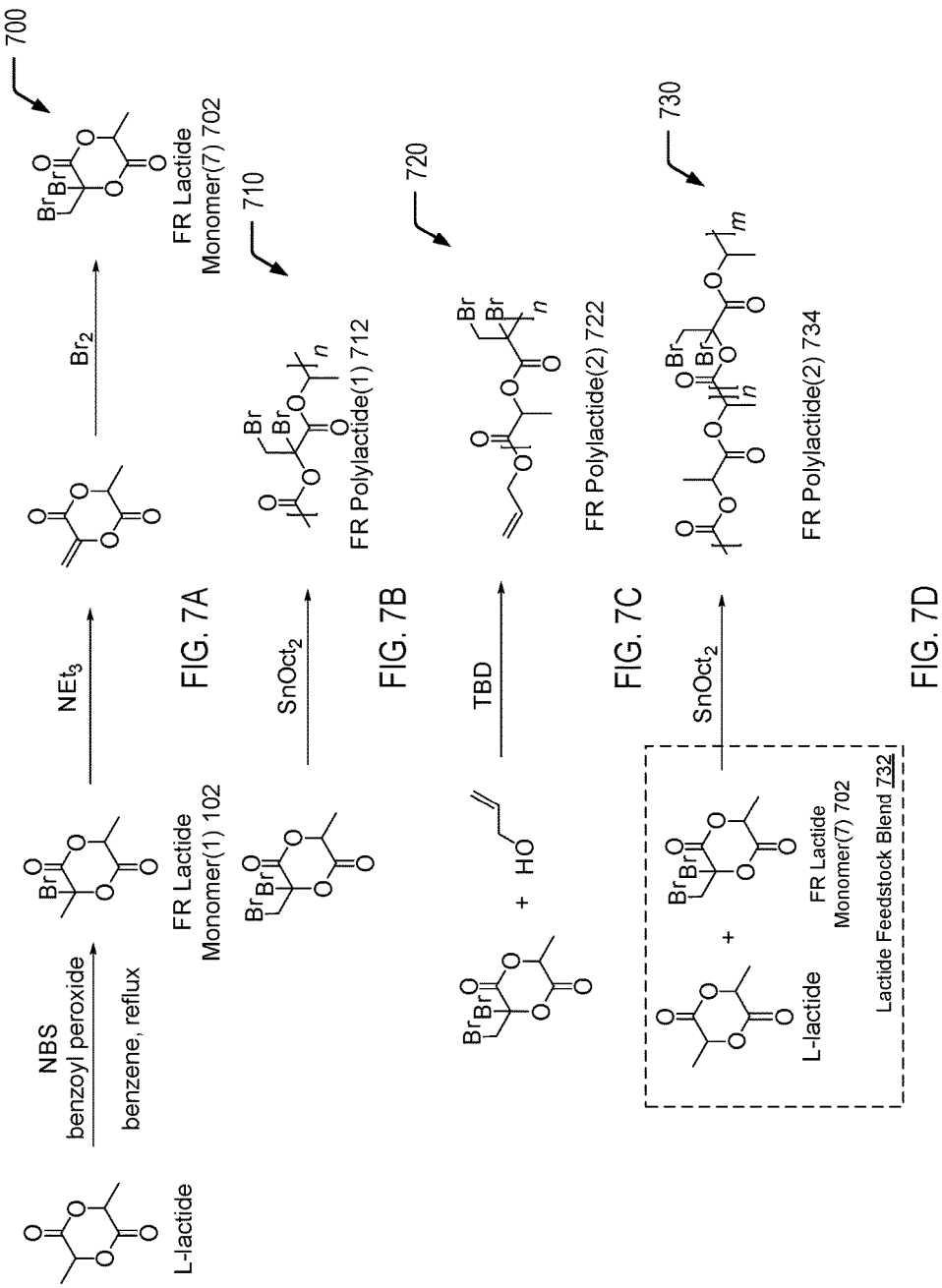

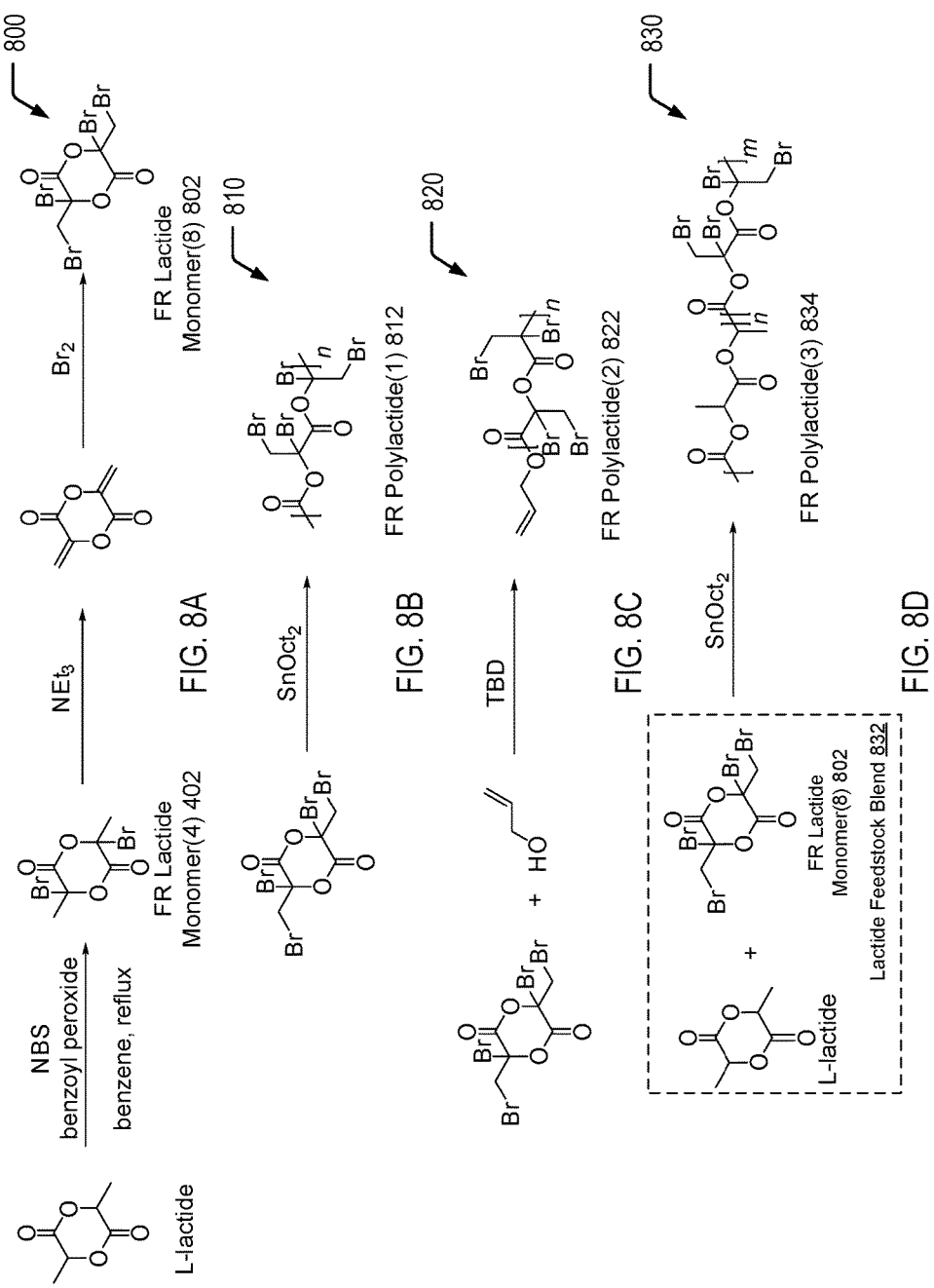

FLAME RETARDANT LACTIDE MONOMORS FOR POLYLACTIDE SYNTHESIS

BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

SUMMARY

According to an embodiment, a process of forming a flame retardant polylactide is disclosed. The process includes forming a flame retardant lactide monomer. The process also includes forming a lactide feedstock that includes at least the flame retardant lactide monomer. The process further includes polymerizing the lactide feedstock to form a flame retardant polylactide.

According to another embodiment, a flame retardant polylactide is disclosed. The flame retardant polylactide is formed by a process that includes forming a lactide feedstock that includes at least a flame retardant lactide monomer and polymerizing the lactide feedstock to form the flame retardant polylactide.

According to another embodiment, an article of manufacture is disclosed. The article of manufacture is formed by a process that includes forming a lactide feedstock that includes a first amount of an L-lactide monomer and a second amount of a flame retardant lactide monomer. The flame retardant lactide monomer includes at least one bromide group or at least one phosphate group. The process also includes polymerizing the lactide feedstock to form a flame retardant polylactide, forming a blend that includes the flame retardant polylactide and a second polymeric material, and forming an article of manufacture from the blend. The second amount of the flame retardant lactide monomer in the lactide feedstock is selected such that the article of manufacture has flame retardancy characteristics that satisfy a plastics flammability standard.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2A is a chemical reaction diagram illustrating an example of a process of forming a second flame retardant lactide monomer from the first flame retardant lactide monomer of FIG. 1A, according to an embodiment.

FIG. 2B is a chemical reaction diagram illustrating an example of a process of forming a first flame retardant polylactide from the second flame retardant lactide monomer of FIG. 2A, according to one embodiment.

FIG. 2C is a chemical reaction diagram illustrating an example of a process of forming a second flame retardant polylactide from the second flame retardant lactide monomer of FIG. 2A, according to one embodiment.

FIG. 2D is a chemical reaction diagram illustrating an example of a process of forming a third flame retardant polylactide from a monomer blend that includes a lactide monomer and the second flame retardant lactide monomer of FIG. 2A, according to one embodiment.

FIG. 3A is a chemical reaction diagram illustrating an example of a process of forming a third flame retardant lactide monomer from the second flame retardant lactide monomer of FIG. 2A, according to an embodiment.

FIG. 3B is a chemical reaction diagram illustrating an example of a process of forming a first flame retardant polylactide from the third flame retardant lactide monomer of FIG. 3A, according to one embodiment.

FIG. 3C is a chemical reaction diagram illustrating an example of a process of forming a second flame retardant polylactide from the third flame retardant lactide monomer of FIG. 32A, according to one embodiment.

FIG. 3D is a chemical reaction diagram illustrating an example of a process of forming a third flame retardant polylactide from a monomer blend that includes a lactide monomer and the third flame retardant lactide monomer of FIG. 3A, according to one embodiment.

FIG. 4A is a chemical reaction diagram illustrating an example of a process of forming a fourth flame retardant lactide monomer from an L-lactide molecule, according to one embodiment.

FIG. 4B is a chemical reaction diagram illustrating an example of a process of forming a first flame retardant polylactide from the fourth flame retardant lactide monomer of FIG. 4A, according to one embodiment.

FIG. 4C is a chemical reaction diagram illustrating an example of a process of forming a second flame retardant polylactide from the fourth flame retardant lactide monomer of FIG. 4A, according to one embodiment.

FIG. 4D is a chemical reaction diagram illustrating an example of a process of forming a third flame retardant polylactide from a monomer blend that includes a lactide monomer and the fourth flame retardant lactide monomer of FIG. 4A, according to one embodiment.

FIG. 5A is a chemical reaction diagram illustrating an example of a process of forming a fifth flame retardant lactide monomer from the fourth flame retardant lactide monomer of FIG. 4A, according to an embodiment.

FIG. 5B is a chemical reaction diagram illustrating an example of a process of forming a first flame retardant polylactide from the fifth flame retardant lactide monomer of FIG. 5A, according to one embodiment.

FIG. 5C is a chemical reaction diagram illustrating an example of a process of forming a second flame retardant polylactide from the fifth flame retardant lactide monomer of FIG. 5A, according to one embodiment.

FIG. 5D is a chemical reaction diagram illustrating an example of a process of forming a third flame retardant polylactide from a monomer blend that includes a lactide monomer and the fifth flame retardant lactide monomer of FIG. 5A, according to one embodiment.

FIG. 6A is a chemical reaction diagram illustrating an example of a process of forming a sixth flame retardant lactide monomer from the fifth flame retardant lactide monomer of FIG. 5A, according to an embodiment.

FIG. 6B is a chemical reaction diagram illustrating an example of a process of forming a first flame retardant polylactide from the sixth flame retardant lactide monomer of FIG. 6A, according to one embodiment.

FIG. 6C is a chemical reaction diagram illustrating an example of a process of forming a second flame retardant polylactide from the sixth flame retardant lactide monomer of FIG. 6A, according to one embodiment.

FIG. 6D is a chemical reaction diagram illustrating an example of a process of forming a third flame retardant polylactide from a monomer blend that includes a lactide monomer and the sixth flame retardant lactide monomer of FIG. 6A, according to one embodiment.

FIG. 7A is a chemical reaction diagram illustrating an example of a process of forming a seventh flame retardant lactide monomer from the first flame retardant lactide monomer of FIG. 1A, according to one embodiment.

FIG. 7B is a chemical reaction diagram illustrating an example of a process of forming a first flame retardant polylactide from the seventh flame retardant lactide monomer of FIG. 7A, according to one embodiment.

FIG. 7C is a chemical reaction diagram illustrating an example of a process of forming a second flame retardant polylactide from the seventh flame retardant lactide monomer of FIG. 7A, according to one embodiment.

FIG. 7D is a chemical reaction diagram illustrating an example of a process of forming a third flame retardant polylactide from a monomer blend that includes a lactide monomer and the seventh flame retardant lactide monomer of FIG. 7A, according to one embodiment.

FIG. 8A is a chemical reaction diagram illustrating an example of a process of forming an eighth flame retardant lactide monomer from the fourth flame retardant lactide monomer of FIG. 4A, according to one embodiment.

FIG. 8B is a chemical reaction diagram illustrating an example of a process of forming a first flame retardant polylactide from the eighth flame retardant lactide monomer of FIG. 8A, according to one embodiment.

FIG. 8C is a chemical reaction diagram illustrating an example of a process of forming a second flame retardant polylactide from the eighth flame retardant lactide monomer of FIG. 8A, according to one embodiment.

FIG. 8D is a chemical reaction diagram illustrating an example of a process of forming a third flame retardant polylactide from a monomer blend that includes a lactide monomer and the eighth flame retardant lactide monomer of FIG. 8A, according to one embodiment.

DETAILED DESCRIPTION

The present disclosure describes flame retardant lactide monomers and flame retardant polylactides formed from the flame retardant lactide monomers. The flame retardant (FR) lactide monomers of the present disclosure may be formed by adding one or more flame retardant moieties to an L-lactide molecule (or derivatives thereof). As described further herein, examples of FR moieties that are added to the L-lactide molecule may include one or more halogen moieties (e.g., one or more bromine moieties) or one or more phosphorus moieties (e.g., one or more phosphate groups). The FR lactide monomers of the present disclosure may be incorporated into a lactide polymer backbone by adding a desired amount of a particular FR lactide monomer (or a combination of multiple FR lactide monomers of the present disclosure) into a lactide feedstock. The addition of FR groups to lactide monomers prior to polymerization may result in particular flame retardancy characteristics being directly imparted to the resulting polylactides by incorporating the FR groups along a length of the lactide polymer backbone. In some cases, the FR polylactides of the present disclosure may represent the major component of a desired material or may be blended with other material(s) to adjust the flammability resistance of the material.

In some cases, one or more of the FR polylactides of the present disclosure may be blended with a polymeric material, and the resulting blend may have flame retardancy characteristics that may satisfy a plastics flammability standard. As an example, the plastics flammability standard may be specified by Underwriters Laboratories® (referred to as "UL" herein), such as UL 94, entitled "Standard for Safety of Flammability of Plastic Materials for Parts in Devices and Appliances testing." The UL 94 standard defines various criteria that may be used to classify a particular plastic based on a degree of flame-retardancy. In this context, tests are generally conducted on a 5-inch×0.5-inch (12.7 cm×1.27 cm) specimen of a minimum approved thickness (e.g., 0.7 mm, 2.55 mm, or 3.04 mm). To illustrate, in order for a plastic to be assigned a "V-1" classification, UL 94 specifies that burning stops within 30 seconds on a vertical specimen and that drips of particles are allowed as long as the particles are not inflamed. In order for the plastic to be assigned a "V-0" classification, UL 94 specifies that burning stops within 10 seconds on a vertical specimen and that drips of particles are allowed as long as the particles are not inflamed. Testing may be conducted on a 5-inch×0.5-inch (12.7 cm×1.27 cm) specimen of a minimum approved thickness (according to the UL 94 standard). It will be appreciated that the UL 94 V-1 and V-0 plastics flammability standards are for example purposes only. Alternative or additional plastics flammability standard(s) may be applicable in various contexts.

Figure 1A:
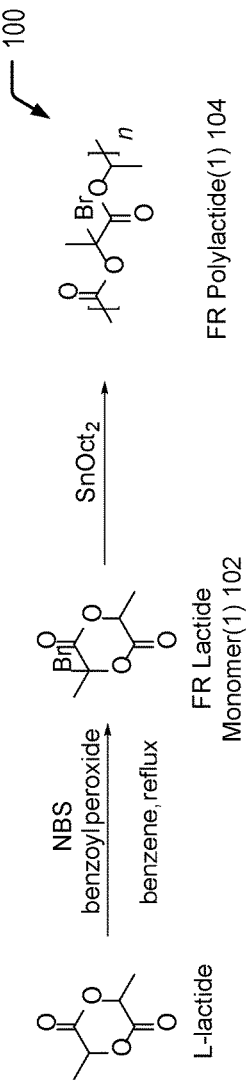
FIG. 1A is a chemical reaction diagram illustrating an example of a process of forming a first flame retardant polylactide from a first flame retardant lactide monomer that is formed from an L-lactide molecule, according to one embodiment.

Referring to FIG. 1A, a chemical reaction diagram 100 illustrates an example of a process of forming a first FR lactide monomer 102 and utilizing the first FR lactide monomer 102 to form various FR polylactides.

The first chemical reaction depicted in FIG. 1A illustrates that, starting from an L-lactide molecule, radical monobromination at the carbon alpha to the carbonyl results in the addition of a flame retardant moiety to the L-lactide molecule. The resulting molecule is referred to herein as the first FR lactide monomer 102. In a particular embodiment, the first FR lactide monomer 102 may be formed by radical bromination of the carbon alpha to the carbonyl of the L-lactide molecule by N-bromosuccinimide (NBS) using a radical initiator such as benzoyl peroxide in a solvent such as benzene (as shown in the embodiment depicted in FIG. 1A, among other alternatives). The first FR lactide monomer 102 represents a first example of a monobrominated FR lactide monomer. As illustrated and described further herein with respect to FIG. 2A, the first FR lactide monomer 102 of FIG. 1A may be used to form the second FR lactide monomer 202, representing a second example of a monobrominated FR lactide monomer.

In the second chemical reaction depicted in FIG. 1A, the first FR lactide monomer 102 may be used to form a first FR polylactide 104. In a particular embodiment, synthesis of the first FR polylactide 104 may include the use of Lewis acidic conditions, such as heating as a melt with tin(II) octanoate (identified as "SnOct$_2$" in FIG. 1A). In some cases, an article of manufacture that includes the first FR polylactide 104 of FIG. 1A may (due to the incorporation of a single bromine group in each repeat unit along the length of the lactide polymer backbone) have flame retardancy characteristics in order to be assigned a UL 94 V-1 classification or a UL 94 V-0 classification.

Figure 1B:
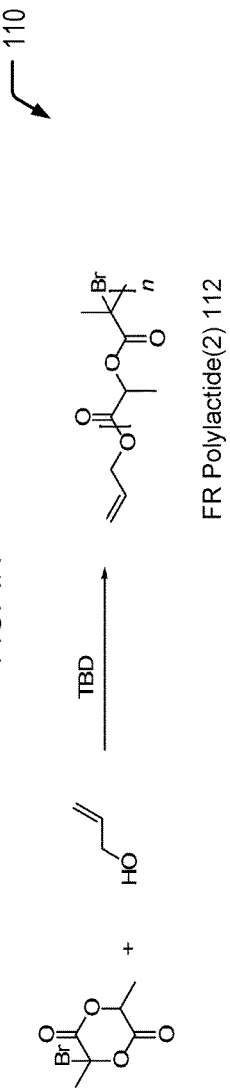
FIG. 1B is a chemical reaction diagram illustrating an example of a process of forming a second flame retardant polylactide from the first flame retardant lactide monomer of FIG. 1A, according to one embodiment.

Referring to FIG. 1B, a chemical reaction diagram 110 illustrates an example of a process of forming a second FR polylactide 112 using the first FR lactide monomer 102 of FIG. 1A. In contrast to the example synthetic procedure of FIG. 1A, FIG. 1B illustrates that other possible conditions could include using an alcohol initiator, such as allyl alcohol (as shown in the example of FIG. 1B), and a triazabicyclodecene (TBD) catalyst, which results in the second FR polylactide 112 having a terminal cross-linkable (or polymerizable) group. To illustrate, the second FR polylactide 112 includes a terminal vinyl group which may be used in subsequent cross-linking reactions or to synthesize "bottlebrush" polymers, among other alternatives. In some cases, an article of manufacture that includes the second FR polylactide 112 of FIG. 1B may (due to the incorporation of a single bromine group in each repeat unit along the length of the lactide polymer backbone) have flame retardancy characteristics in order to be assigned a UL 94 V-1 classification or a UL 94 V-0 classification.

Figure 1C:
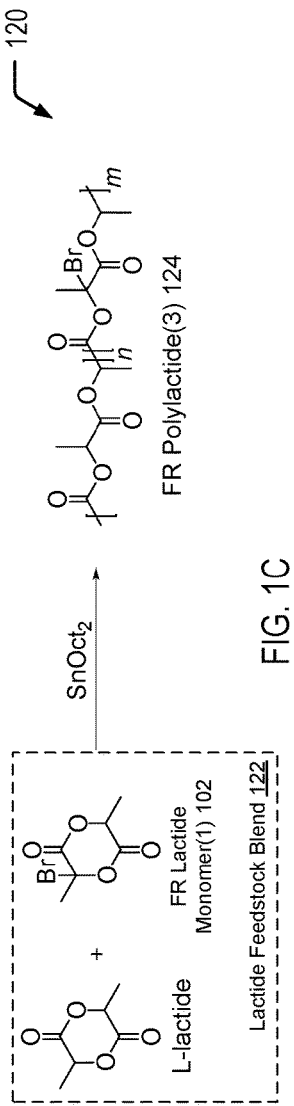
FIG. 1C is a chemical reaction diagram illustrating an example of a process of forming a third flame retardant polylactide from a monomer blend that includes a lactide monomer and the first flame retardant lactide monomer of FIG. 1A, according to one embodiment.

Referring to FIG. 1C, a chemical reaction diagram 120 illustrates an example of a process of forming a third FR polylactide 124 from a blend 122 (identified as "Lactide Feedstock Blend" in FIG. 1C) that includes an unmodified L-lactide monomer and the first FR lactide monomer 102 of FIG. 1A. In the example of FIG. 1C, synthesis of the third FR polylactide 124 from the blend 122 includes the use of Lewis acidic conditions, such as heating as a melt with tin(II) octanoate.

FIG. 1C illustrates an example in which at least one of the FR lactide monomers of the present disclosure may be incorporated into a lactide polymer backbone by adding desired amount(s) of the FR lactide monomer(s) to a lactide feedstock prior to polymerization. In the particular embodiment depicted in FIG. 1C, the first FR lactide monomer 102 of FIG. 1A may be incorporated into the lactide polymer backbone by forming the blend 122. The blend 122 may include a first amount of the "conventional" L-lactide monomer (that does not include one or more FR moieties bonded to the lactide ring) and a second amount of the first FR lactide monomer 102 of FIG. 1A. Polymerization of the blend 122 results in particular flame retardancy characteristics being directly imparted to the resulting third FR polylactide 124. In some cases, the flame retardancy characteristics of the third FR polylactide 124 may be "tuned" by varying the composition of the blend 122.

To illustrate, in some cases, having a first relative amount of the first FR lactide monomer 102 of FIG. 1A in the blend 122 may be sufficient for an article of manufacture that includes the third FR polylactide 124 of FIG. 1C to be assigned a UL 94 V-1 classification or a UL 94 V-0 classification. In FIG. 1C, the integer n is used to identify a portion of the lactide polymer backbone that corresponds to the L-lactide monomer, and the integer m is used to identify a portion of the lactide polymer backbone that corresponds to the first FR lactide monomer 102. FIG. 1C depicts a particular embodiment in which a single flame retardant lactide monomer of the present disclosure (e.g., the first FR lactide monomer 102 of FIG. 1A) is incorporated into the lactide polymer backbone. In other cases, the first FR lactide monomer 102 of FIG. 1A may be blended with one or more additional FR lactide monomers of the present disclosure in order to incorporate more than one flame retardant moiety into a lactide polymer backbone. Other examples of flame retardant lactide monomers are illustrated and further described herein with respect to FIGS. 2A, 3A, 4A, 5A, 6A, 7A, and 8A.

Thus, FIGS. 1A-1C illustrate an example of a process of forming a flame retardant lactide monomer (e.g., a monobrominated lactide monomer) and utilizing the flame retardant lactide monomer to form flame retardant polylactides. In some cases, the flame retardant polylactides 104, 112, and 124 depicted in FIGS. 1A-1C may be used to form an article of manufacture that satisfies a plastics flammability standard, such as the UL V-0 or V-1 standards. In other cases, the article of manufacture may be formed from a blend that includes one or more of the FR polylactides 104, 112, and 124 depicted in FIGS. 1A-1C and one or more other polymer materials (e.g., polymers formed from biorenewable materials and/or petroleum-based polymers). To illustrate, in some cases, one or more of the FR polylactides 104, 112, and 124 depicted in FIGS. 1A-1C may be blended with a polyurethane material, a polycarbonate material, an acrylonitrile butadiene styrene (ABS) material, a polyester material, a polyether material, or a combination thereof (among other alternatives). In cases where the blend includes a non-renewable petroleum-based polymer, the addition of one or more of the FR polylactides 104, 112, and 124 to the blend may enable an article of manufacture formed from the blend to satisfy a plastics flammability standard while also increasing the biorenewable content of the polymeric material.

Referring to FIG. 2A, a chemical reaction diagram 200 illustrates an example of a process of forming a second flame retardant lactide monomer 202 from the first flame retardant lactide monomer 102 of FIG. 1A, according to an embodiment.

The first chemical reaction depicted in FIG. 2A illustrates that, starting from an L-lactide molecule, radical monobromination at the carbon alpha to the carbonyl results in the addition of a flame retardant moiety to the L-lactide molecule, resulting in the first FR lactide monomer 104 of FIG. 1A. The second chemical reaction depicted in FIG. 2A illustrates that elimination with triethylamine (NEt$_3$) results in the formation of a methylidene lactide intermediate material. The third chemical reaction depicted in FIG. 2A illustrates that the second FR lactide monomer 202 may be synthesized from the methylidene lactide intermediate material. In a particular embodiment, the second FR lactide monomer 202 may be formed from the methylidene lactide intermediate material via an anti-Markovnikov bromination (where bromination occurs at the least substituted position) using HBr and hydrogen peroxide. As illustrated and further described herein with respect to FIG. 7A, the methylidene lactide intermediate material of FIG. 2A may alternatively be utilized to form a dibrominated FR lactide monomer.

As a prophetic example, an anti-Markovnikov bromination process may include dissolving the methylidene lactide intermediate material (e.g., 1 molar equivalent) in a suitable solvent (e.g., dry toluene) at a temperature of 0° C. to form a solution. Benzoyl peroxide (e.g., 0.026 molar equivalents) may be added to the solution, and the mixture may be stirred at 0° C. A steady stream of hydrogen bromide gas may be bubbled directly into this stirring solution at 0° C. for a first time period of about 15 minutes. The mixture may then be stirred for about 15 minutes, and hydrogen bromide gas may be bubbled steadily into the solution for a second time period of about 15 minutes. The mixture may be stirred for an additional 15 minutes, and hydrogen bromide gas may be bubbled steadily into the solution for a third time period of about 15 minutes. The mixture may be stirred at 0° C. for about 1 hour, then at room temperature for about 18 hours. The mixture may then be cooled to 0° C. and ice/water may be added. The layers may be separated, and the aqueous phase may be extracted with ethyl acetate. The combined organic extracts may be washed sequentially with water, $Na_2SO_3$ (aq) solution and brine and then dried (e.g., using $Na_2SO_4$). The mixture may then be concentrated to remove ethyl acetate and toluene, followed by high-vacuum drying.

Referring to FIG. 2B, a chemical reaction diagram 210 illustrates that the second FR lactide monomer 202 of FIG. 2A may be used to form a first FR polylactide 212. In a particular embodiment, synthesis of the first FR polylactide 212 may include the use of Lewis acid conditions, such as heating as a melt with tin(II) octanoate (identified as "SnOct$_2$" in FIG. 2B). In some cases, an article of manufacture that includes the first FR polylactide 212 of FIG. 2B may (due to the incorporation of a single bromine group in each repeat unit along the length of the lactide polymer backbone) have flame retardancy characteristics in order to be assigned a UL 94 V-1 classification or a UL 94 V-0 classification.

Referring to FIG. 2C, a chemical reaction diagram 220 illustrates an example of a process of forming a second FR polylactide 222 using the second FR lactide monomer 202 of FIG. 2A. FIG. 2C illustrates that an alcohol initiator (e.g., allyl alcohol) and a TBD catalyst may be utilized to form the second FR polylactide 222 which has a terminal cross-linkable (or polymerizable) group. To illustrate, the second FR polylactide 222 includes a terminal vinyl group which may be used in subsequent cross-linking reactions or to synthesize "bottle-brush" polymers, among other alternatives. In some cases, an article of manufacture that includes the second FR polylactide 222 of FIG. 2C may (due to the incorporation of the single bromine group in each repeat unit along the length of the lactide polymer backbone) have flame retardancy characteristics in order to be assigned a UL 94 V-1 classification or a UL 94 V-0 classification.

Referring to FIG. 2D, a chemical reaction diagram 230 illustrates an example of a process of forming a third FR polylactide 234 from a blend 232 (identified as "Lactide Feedstock Blend" in FIG. 2D) that includes an unmodified L-lactide monomer and the second FR lactide monomer 202 of FIG. 2A. In the example of FIG. 2D, synthesis of the third FR polylactide 234 from the blend 232 includes the use of Lewis acid conditions, such as heating as a melt with tin(II) octanoate.

FIG. 2D illustrates an example in which at least one of the FR lactide monomers of the present disclosure may be incorporated into a lactide polymer backbone by adding desired amount(s) of the FR lactide monomer(s) to a lactide feedstock prior to polymerization. In the particular embodiment depicted in FIG. 2D, the second FR lactide monomer 202 of FIG. 2A may be incorporated into the lactide polymer backbone by forming the blend 232. The blend 232 may include a first amount of the "conventional" L-lactide monomer (that does not include one or more FR moieties bonded to the lactide ring) and a second amount of the second FR lactide monomer 202 of FIG. 2A. Polymerization of the blend 232 results in particular flame retardancy characteristics being directly imparted to the resulting third FR polylactide 234. In some cases, the flame retardancy characteristics of the third FR polylactide 234 may be "tuned" by varying the composition of the blend 232.

To illustrate, in some cases, having a first relative amount of the second FR lactide monomer 202 of FIG. 2A in the blend 232 may be sufficient for an article of manufacture that includes the third FR polylactide 234 of FIG. 2D to be assigned a UL 94 V-1 classification or a UL 94 V-0 classification. In FIG. 2D, the integer n is used to identify a portion of the lactide polymer backbone that corresponds to the L-lactide monomer, and the integer m is used to identify a portion of the lactide polymer backbone that corresponds to the second FR lactide monomer 202. FIG. 2D depicts a particular embodiment in which a single flame retardant lactide monomer of the present disclosure (e.g., the second FR lactide monomer 202 of FIG. 2A) is incorporated into the lactide polymer backbone. In other cases, the second FR lactide monomer 202 of FIG. 2A may be blended with one or more additional FR lactide monomers of the present disclosure in order to incorporate more than one flame retardant moiety into a lactide polymer backbone. Other examples of flame retardant lactide monomers are illustrated and further described herein with respect to FIGS. 1A, 3A, 4A, 5A, 6A, 7A, and 8A.

Thus, FIGS. 2A-2D illustrate an example of a process of forming a flame retardant lactide monomer (e.g., a mono-brominated lactide monomer that is different from the mono-brominated lactide monomer 102 of FIG. 1A) and utilizing the flame retardant lactide monomer to form flame retardant polylactides. In some cases, the flame retardant polylactides 212, 222, and 234 depicted in FIGS. 2B-2D may be used to form an article of manufacture that satisfies a plastics flammability standard, such as the UL V-0 or V-1 standards. In some cases, an article of manufacture formed from one or more of the flame retardant polylactides 212, 222, and 234 depicted in FIGS. 2B-2D may satisfy the plastics flammability standard. In other cases, the article of manufacture may be formed from a blend that includes one or more of the flame retardant polylactides depicted in FIGS. 2B-2D and another polymer material. To illustrate, in some cases, one or more of the flame retardant polylactides 212, 222, and 234 depicted in FIGS. 2B-2D may be blended with a polyurethane material, a polycarbonate material, an ABS material, a polyester material, a polyether material, or a combination thereof (among other alternatives). In cases where the blend includes non-renewable polymeric materials, the addition of the flame retardant polylactide(s) to the blend may enable the article of manufacture to satisfy a plastics flammability standard while also increasing the biorenewable content of the polymeric material.

Referring to FIG. 3A, a chemical reaction diagram 300 illustrates an example of a process of forming a third FR lactide monomer 302 from the second flame retardant lactide monomer 202 of FIG. 2A, according to an embodiment.

In a particular embodiment, the third FR lactide monomer 302 of FIG. 3A may be synthesized from the second FR lactide monomer 202 of FIG. 2A and a phosphorus-containing molecule (e.g., a phosphate molecule, identified by the formula "P(OR)$_3$" in FIG. 3A) under Arbuzov conditions. Examples of R groups may include methyl, ethyl, or phenyl groups (e.g., inexpensive commercially available groups) but may also include more complex groups such as furyl or tolyl groups or other groups such as vinyl, allyl, or longer chain groups. In a particular embodiment, the second FR lactide monomer 202 of FIG. 2A may be subjected to Arbuzov reaction conditions using triphenyl phosphate, $P(OPh)_3$, and heat to convert the bromide group into a phosphate group.

Referring to FIG. 3B, a chemical reaction diagram 310 illustrates that the third FR lactide monomer 302 of FIG. 3A may be used to form a first FR polylactide 312. In a particular embodiment, synthesis of the first FR polylactide 312 may include the use of Lewis acid conditions, such as heating as a melt with tin(II) octanoate (identified as "$SnOct_2$" in FIG. 3B). In some cases, an article of manufacture that includes the first FR polylactide 312 of FIG. 3B may (due to the incorporation of one flame retardant moiety in each repeat unit along the length of the lactide polymer backbone) have flame retardancy characteristics in order to be assigned a UL 94 V-1 classification or a UL 94 V-0 classification.

Referring to FIG. 3C, a chemical reaction diagram 320 illustrates an example of a process of forming a second FR polylactide 322 using the third FR lactide monomer 302 of FIG. 3A. FIG. 3C illustrates that an alcohol initiator (e.g., allyl alcohol) and a TBD catalyst may be utilized to form the second FR polylactide 322 which has a terminal cross-linkable (or polymerizable) group. To illustrate, the second FR polylactide 322 includes a terminal vinyl group which may be used in subsequent cross-linking reactions or to synthesize "bottle-brush" polymers, among other alternatives. In some cases, an article of manufacture that includes the second FR polylactide 322 of FIG. 3C may (due to the incorporation of the single phosphorus moiety in each repeat unit along the length of the lactide polymer backbone) have flame retardancy characteristics in order to be assigned a UL 94 V-1 classification or a UL 94 V-0 classification.

Referring to FIG. 3D, a chemical reaction diagram 330 illustrates an example of a process of forming a third FR polylactide 334 from a blend 332 (identified as "Lactide Feedstock Blend" in FIG. 3D) that includes an unmodified L-lactide monomer and the third FR lactide monomer 302 of FIG. 3A. In the example of FIG. 3D, synthesis of the third FR polylactide 334 from the blend 332 includes the use of Lewis acid conditions, such as heating as a melt with tin(II) octanoate.

FIG. 3D illustrates an example in which at least one of the FR lactide monomers of the present disclosure may be incorporated into a lactide polymer backbone by adding desired amount(s) of the FR lactide monomer(s) to a lactide feedstock prior to polymerization. In the particular embodiment depicted in FIG. 3D, the third FR lactide monomer 302 of FIG. 3A may be incorporated into the lactide polymer backbone by forming the blend 332. The blend 332 may include a first amount of the "conventional" L-lactide monomer (that does not include one or more FR moieties bonded to the lactide ring) and a second amount of the third FR lactide monomer 302 of FIG. 3A. Polymerization of the blend 332 results in particular flame retardancy characteristics being directly imparted to the resulting third FR polylactide 334. In some cases, the flame retardancy characteristics of the third FR polylactide 334 may be "tuned" by varying the composition of the blend 332.

To illustrate, in some cases, having a first relative amount of the third FR lactide monomer 302 of FIG. 3A in the blend 332 may be sufficient for an article of manufacture that includes the third FR polylactide 334 of FIG. 3D to be assigned a UL 94 V-1 classification or a UL 94 V-0 classification. In FIG. 3D, the integer n is used to identify a portion of the lactide polymer backbone that corresponds to the L-lactide monomer, and the integer m is used to identify a portion of the lactide polymer backbone that corresponds to the third FR lactide monomer 302. FIG. 3D depicts a particular embodiment in which a single flame retardant lactide monomer of the present disclosure (e.g., the second FR lactide monomer 302 of FIG. 3A) is incorporated into the lactide polymer backbone. In other cases, the third FR lactide monomer 302 of FIG. 3A may be blended with one or more additional FR lactide monomers of the present disclosure in order to incorporate more than one flame retardant moiety into a lactide polymer backbone. Other examples of flame retardant lactide monomers are illustrated and further described herein with respect to FIGS. 1A, 2A, 4A, 5A, 6A, 7A, and 8A.

Thus, FIGS. 3A-3D illustrate an example of a process of forming a flame retardant lactide monomer (e.g., a monophosphate lactide monomer) and utilizing the flame retardant lactide monomer to form flame retardant polylactides. In some cases, the flame retardant polylactides 312, 322, and 334 depicted in FIGS. 3B-3D may be used to form an article of manufacture that satisfies a plastics flammability standard, such as the UL V-0 or V-1 standards. In some cases, an article of manufacture formed from one or more of the flame retardant polylactides 312, 322, and 334 depicted in FIGS. 3B-3D may satisfy the plastics flammability standard. In other cases, the article of manufacture may be formed from a blend that includes one or more of the flame retardant polylactides 312, 322, and 334 depicted in FIGS. 3B-3D and another polymer material. To illustrate, in some cases, one or more of the flame retardant polylactides 312, 322, and 334 depicted in FIGS. 3B-3D may be blended with a polyurethane material, a polycarbonate material, an ABS material, a polyester material, a polyether material, or a combination thereof (among other alternatives). In cases where the blend includes non-renewable polymeric materials, the addition of one or more of the flame retardant polylactide(s) may enable the article of manufacture to satisfy a plastics flammability standard while also increasing the biorenewable content of the polymeric material.

Referring to FIG. 4A, a chemical reaction diagram 400 illustrates an example of a process of forming a fourth FR lactide monomer 402 from an L-lactide molecule, according to one embodiment. In contrast to the first FR lactide monomer 102 (an example of a monobrominated lactide monomer) that is formed from an L-lactide molecule as previously described herein with respect to FIG. 1A, FIG. 4A illustrates an alternative example in which a dibrominated lactide monomer may be formed the L-lactide molecule. In a particular embodiment, the reaction conditions previously described herein with respect to the synthesis of the first FR lactide monomer 102 of FIG. 1A may be modified to give reactions on both halves of the lactide ring. Starting from the L-lactide molecule, FIG. 4A illustrates that radical dibromination (with more equivalents of NBS than used in the example of FIG. 1A) at each of the carbons alpha to the carbonyl groups results in the formation of the fourth lactide monomer 402.

Referring to FIG. 4B, a chemical reaction diagram 410 illustrates that the fourth FR lactide monomer 402 of FIG. 4A may be used to form a first FR polylactide 412. In a particular embodiment, synthesis of the first FR polylactide 412 may include the use of Lewis acid conditions, such as heating as a melt with tin(II) octanoate (identified as "$SnOct_2$" in FIG. 4B). In some cases, an article of manufacture that includes the first FR polylactide 412 of FIG. 4B may (due to the incorporation of two flame retardant moieties in each repeat unit along the length of the lactide polymer backbone) have flame retardancy characteristics in order to be assigned a UL 94 V-1 classification or a UL 94 V-0 classification.

Referring to FIG. 4C, a chemical reaction diagram 420 illustrates an example of a process of forming a second FR polylactide 422 using the fourth FR lactide monomer 402 of FIG. 4A. FIG. 4C illustrates that an alcohol initiator (e.g., allyl alcohol) and a TBD catalyst may be utilized to form the second FR polylactide 422 which has a terminal cross-linkable (or polymerizable) group. To illustrate, the second FR polylactide 422 includes a terminal vinyl group which may be used in subsequent cross-linking reactions or to synthesize "bottle-brush" polymers, among other alternatives. In some cases, an article of manufacture that includes the second FR polylactide 422 of FIG. 4C may (due to the incorporation of two flame retardant moieties per repeat unit along the length of the lactide polymer backbone) have flame retardancy characteristics in order to be assigned a UL 94 V-1 classification or a UL 94 V-0 classification.

Referring to FIG. 4D, a chemical reaction diagram 430 illustrates an example of a process of forming a third polylactide 434 from a blend 432 (identified as "Lactide Feedstock Blend" in FIG. 4D) that includes an unmodified L-lactide monomer and the fourth FR lactide monomer 402 of FIG. 4A. In the example of FIG. 4D, synthesis of the third FR polylactide 434 from the blend 432 includes the use of Lewis acid conditions, such as heating as a melt with tin(II) octanoate.

FIG. 4D illustrates an example in which at least one of the FR lactide monomers of the present disclosure may be incorporated into a lactide polymer backbone by adding desired amount(s) of the FR lactide monomer(s) to a lactide feedstock prior to polymerization. In the particular embodiment depicted in FIG. 4D, the fourth FR lactide monomer 402 of FIG. 4A may be incorporated into the lactide polymer backbone by forming the blend 432. The blend 432 may include a first amount of the "conventional" L-lactide monomer (that does not include one or more FR moieties bonded to the lactide ring) and a second amount of the fourth FR lactide monomer 402 of FIG. 4A. Polymerization of the blend 432 results in particular flame retardancy characteristics being directly imparted to the resulting third FR polylactide 434. In some cases, the flame retardancy characteristics of the third FR polylactide 434 may be "tuned" by varying the composition of the blend 432.

To illustrate, in some cases, having a first relative amount of the fourth FR lactide monomer 402 of FIG. 4A in the blend 432 may be sufficient for an article of manufacture that includes the third FR polylactide 434 of FIG. 4D to be assigned a UL 94 V-1 classification or a UL 94 V-0 classification. In FIG. 4D, the integer n is used to identify a portion of the lactide polymer backbone that corresponds to the L-lactide monomer, and the integer m is used to identify a portion of the lactide polymer backbone that corresponds to the fourth FR lactide monomer 402. FIG. 4D depicts a particular embodiment in which a single flame retardant lactide monomer of the present disclosure (e.g., the fourth FR lactide monomer 402 of FIG. 4A) is incorporated into the lactide polymer backbone. In other cases, the fourth FR lactide monomer 402 of FIG. 4A may be blended with one or more additional FR lactide monomers of the present disclosure in order to incorporate more than one flame retardant moiety into a lactide polymer backbone. Other examples of flame retardant lactide monomers are illustrated and further described herein with respect to FIGS. 1A, 2A, 3A, 5A, 6A, 7A, and 8A.

Thus, FIGS. 4A-4D illustrate an example of a process of forming a flame retardant lactide monomer (e.g., a dibrominated lactide monomer that is different form the monobrominated lactide monomers of FIGS. 1A and 2A) and utilizing the flame retardant lactide monomer to form flame retardant polylactides. In some cases, the flame retardant polylactides 412, 422, and 434 depicted in FIGS. 4B-4D may be used to form an article of manufacture that satisfies a plastics flammability standard, such as the UL V-0 or V-1 standards. In some cases, an article of manufacture formed from one or more of the flame retardant polylactides 412, 422, and 434 depicted in FIGS. 4B-4D may satisfy the plastics flammability standard. In other cases, the article of manufacture may be formed from a blend that includes one or more of the flame retardant polylactides 412, 422, and 434 depicted in FIGS. 4B-4D and another polymer material. To illustrate, in some cases, one or more of the flame retardant polylactides 412, 422, and 434 depicted in FIGS. 4B-4D may be blended with a polyurethane material, a polycarbonate material, an ABS material, a polyester material, a polyether material, or a combination thereof (among other alternatives). In cases where the blend includes non-renewable polymeric materials, the addition of the flame retardant polylactide(s) may enable the article of manufacture to satisfy a plastics flammability standard while also increasing the biorenewable content of the polymeric material.

Referring to FIG. 5A, a chemical reaction diagram 500 illustrates an example of a process of forming a fifth FR lactide monomer 502 from the fourth flame retardant lactide monomer 402 of FIG. 4A, according to an embodiment.

The first chemical reaction depicted in FIG. 5A illustrates that, starting from an L-lactide molecule, radical monobromination at each of the two carbons alpha to the carbonyl groups results in the addition of two flame retardant moieties to the L-lactide molecule, resulting in the fourth FR lactide monomer 402 of FIG. 4A. The second chemical reaction depicted in FIG. 5A illustrates that elimination with triethylamine ($NEt_3$) results in the formation of a dimethylidene lactide intermediate material. The third chemical reaction depicted in FIG. 5A illustrates that the fifth FR lactide monomer 502 may be synthesized from the dimethylidene lactide intermediate material. In a particular embodiment, the fifth FR lactide monomer 502 may be formed from the dimethylidene lactide intermediate material via an anti-Markovnikov bromination (where bromination occurs at the least substituted position) using HBr and hydrogen peroxide. In a particular embodiment, the fifth FR lactide monomer 502 may be synthesized using an anti-Markovnikov bromination process that is similar to the process described herein with respect to the second FR lactide monomer 202 of FIG. 2A. As illustrated and further described herein with respect to FIG. 8A, the dimethylidene lactide intermediate material of FIG. 5A may be alternatively be utilized to form a tetrabrominated FR lactide monomer.

Referring to FIG. 5B, a chemical reaction diagram 510 illustrates that the fifth FR lactide monomer 502 of FIG. 5A may be used to form a first FR polylactide 512. In a particular embodiment, synthesis of the first FR polylactide 512 may include the use of Lewis acid conditions, such as heating as a melt with tin(II) octanoate (identified as "$SnOct_2$" in FIG. 5B). In some cases, an article of manufacture that includes the first FR polylactide 512 of FIG. 5B may (due to the incorporation of two flame retardant moieties in each repeat unit along the length of the lactide polymer backbone) have flame retardancy characteristics in order to be assigned a UL 94 V-1 classification or a UL 94 V-0 classification.

Referring to FIG. 5C, a chemical reaction diagram 520 illustrates an example of a process of forming a second FR polylactide 522 using the fifth FR lactide monomer 502 of FIG. 5A. FIG. 5C illustrates that an alcohol initiator (e.g., allyl alcohol) and a TBD catalyst may be utilized to form the second FR polylactide 522 which has a terminal cross-linkable (or polymerizable) group. To illustrate, the second FR polylactide 522 includes a terminal vinyl group which may be used in subsequent cross-linking reactions or to synthesize "bottle-brush" polymers, among other alternatives. In some cases, an article of manufacture that includes the second FR polylactide 522 of FIG. 5C may (due to the incorporation of two flame retardant moieties per repeat unit along the length of the lactide polymer backbone) have flame retardancy characteristics in order to be assigned a UL 94 V-1 classification or a UL 94 V-0 classification.

Referring to FIG. 5D, a chemical reaction diagram 530 illustrates an example of a process of forming a third FR polylactide 534 from a blend 532 (identified as "Lactide Feedstock Blend" in FIG. 5D) that includes an unmodified L-lactide monomer and the fifth FR lactide monomer 502 of FIG. 5A. In the example of FIG. 5D, synthesis of the third FR polylactide 534 from the blend 532 includes the use of Lewis acid conditions, such as heating as a melt with tin(II) octanoate.

FIG. 5D illustrates an example in which at least one of the FR lactide monomers of the present disclosure may be incorporated into a lactide polymer backbone by adding desired amount(s) of the FR lactide monomer(s) to a lactide feedstock prior to polymerization. In the particular embodiment depicted in FIG. 5D, the fifth FR lactide monomer 502 of FIG. 5A may be incorporated into the lactide polymer backbone by forming the blend 532. The blend 532 may include a first amount of the "conventional" L-lactide monomer (that does not include one or more FR moieties bonded to the lactide ring) and a second amount of the fifth FR lactide monomer 502 of FIG. 5A. Polymerization of the blend 532 results in particular flame retardancy characteristics being directly imparted to the resulting third FR polylactide 534. In some cases, the flame retardancy characteristics of the third FR polylactide 534 may be "tuned" by varying the composition of the blend 532.

To illustrate, in some cases, having a first relative amount of the fifth FR lactide monomer 502 of FIG. 5A in the blend 532 may be sufficient for an article of manufacture that includes the third FR polylactide 534 of FIG. 5D to be assigned a UL 94 V-1 classification or a UL 94 V-0 classification. In FIG. 5D, the integer n is used to identify a portion of the lactide polymer backbone that corresponds to the L-lactide monomer, and the integer m is used to identify a portion of the lactide polymer backbone that corresponds to the fifth FR lactide monomer 502. FIG. 5D depicts a particular embodiment in which a single flame retardant lactide monomer of the present disclosure (e.g., the fifth FR lactide monomer 502 of FIG. 5A) is incorporated into the lactide polymer backbone. In other cases, the fifth FR lactide monomer 502 of FIG. 5A may be blended with one or more additional FR lactide monomers of the present disclosure in order to incorporate more than one flame retardant moiety into a lactide polymer backbone. Other examples of flame retardant lactide monomers are illustrated and further described herein with respect to FIGS. 1A, 2A, 3A, 4A, 6A, 7A, and 8A.

Thus, FIGS. 5A-5D illustrate an example of a process of forming a flame retardant lactide monomer (e.g., a dibrominated lactide monomer that is different from the dibrominated lactide monomer 402 of FIG. 4A) and utilizing the flame retardant lactide monomer to form flame retardant polylactides. In some cases, the flame retardant polylactides 512, 522, and 534 depicted in FIGS. 5B-5D may be used to form an article of manufacture that satisfies a plastics flammability standard, such as the UL V-0 or V-1 standards. In some cases, an article of manufacture formed from one or more of the flame retardant polylactides depicted in FIGS. 5B-5D may satisfy the plastics flammability standard. In other cases, the article of manufacture may be formed from a blend that includes one or more of the flame retardant polylactides 512, 522, and 534 depicted in FIGS. 5B-5D and another polymer material. To illustrate, in some cases, one or more of the flame retardant polylactides 512, 522, and 534 depicted in FIGS. 5B-5D may be blended with a polyurethane material, a polycarbonate material, an ABS material, a polyester material, a polyether material, or a combination thereof (among other alternatives). In cases where the blend includes non-renewable polymeric materials, the addition of the flame retardant polylactide(s) may enable the article of manufacture to satisfy a plastics flammability standard while also increasing the biorenewable content of the polymeric material.

Referring to FIG. 6A, a chemical reaction diagram 600 illustrates an example of a process of forming a sixth FR lactide monomer 602 from the fifth flame retardant lactide monomer 502 of FIG. 5A, according to an embodiment.

In a particular embodiment, the sixth FR lactide monomer 602 may be synthesized from the fifth FR lactide monomer 502 of FIG. 5A and a phosphorus-containing molecule (e.g., a phosphate molecule, identified by the formula "P(OR)$_3$" in FIG. 6A) under Arbuzov conditions. Examples of R groups may include methyl, ethyl, or phenyl groups (e.g., inexpensive commercially available groups) but may also include more complex groups such as furyl or tolyl groups or other groups such as vinyl, allyl, or longer chain groups. For example, the fifth FR lactide monomer 502 of FIG. 5A may be subjected to Arbuzov reaction conditions using triphenyl phosphate, P(OPh)$_3$, and heat to convert the two bromide groups into two phosphate groups.

Referring to FIG. 6B, a chemical reaction diagram 610 illustrates that the sixth FR lactide monomer 602 of FIG. 6A may be used to form a first FR polylactide 612. In a particular embodiment, synthesis of the first FR polylactide 612 may include the use of Lewis acid conditions, such as heating as a melt with tin(II) octanoate (identified as "SnOct$_2$" in FIG. 6B). In some cases, an article of manufacture that includes the first FR polylactide 612 of FIG. 6B may (due to the incorporation of two flame retardant moieties in each repeat unit along the length of the lactide polymer backbone) have flame retardancy characteristics in order to be assigned a UL 94 V-1 classification or a UL 94 V-0 classification.

Referring to FIG. 6C, a chemical reaction diagram 620 illustrates an example of a process of forming a second FR polylactide 622 using the sixth FR lactide monomer 602 of FIG. 6A. FIG. 6C illustrates that an alcohol initiator (e.g., allyl alcohol) and a TBD catalyst may be utilized to form the second FR polylactide 622 which has a terminal cross-linkable (or polymerizable) group. To illustrate, the second FR polylactide 622 includes a terminal vinyl group which may be used in subsequent cross-linking reactions or to synthesize "bottle-brush" polymers, among other alternatives. In some cases, an article of manufacture that includes the second FR polylactide 622 of FIG. 6C may (due to the incorporation of two flame retardant moieties per repeat unit along the length of the lactide polymer backbone) have flame retardancy characteristics in order to be assigned a UL 94 V-1 classification or a UL 94 V-0 classification.

Referring to FIG. 6D, a chemical reaction diagram 630 illustrates an example of a process of forming a third flame retardant polylactide 634 from a blend 632 (identified as "Lactide Feedstock Blend" in FIG. 6D) that includes an unmodified L-lactide monomer and the sixth FR lactide monomer 602 of FIG. 6A. In the example of FIG. 6D, synthesis of the third FR polylactide 634 from the blend 632 includes the use of Lewis acid conditions, such as heating as a melt with tin(II) octanoate.

FIG. 6D illustrates an example in which at least one of the FR lactide monomers of the present disclosure may be incorporated into a lactide polymer backbone by adding desired amount(s) of the FR lactide monomer(s) to a lactide feedstock prior to polymerization. In the particular embodiment depicted in FIG. 6D, the sixth FR lactide monomer 602 of FIG. 6A may be incorporated into the lactide polymer backbone by forming the blend 632. The blend 632 may include a first amount of the "conventional" L-lactide monomer (that does not include one or more FR moieties bonded to the lactide ring) and a second amount of the sixth FR lactide monomer 602 of FIG. 6A. Polymerization of the blend 632 results in particular flame retardancy characteristics being directly imparted to the resulting third FR polylactide 634. In some cases, the flame retardancy characteristics of the third FR polylactide 634 may be "tuned" by varying the composition of the blend 632.

To illustrate, in some cases, having a first relative amount of the sixth FR lactide monomer 602 of FIG. 6A in the blend 632 may be sufficient for an article of manufacture that includes the third FR polylactide 634 of FIG. 6D to be assigned a UL 94 V-1 classification or a UL 94 V-0 classification. In FIG. 6D, the integer n is used to identify a portion of the lactide polymer backbone that corresponds to the L-lactide monomer, and the integer m is used to identify a portion of the lactide polymer backbone that corresponds to the sixth FR lactide monomer 602. FIG. 6D depicts a particular embodiment in which a single flame retardant lactide monomer of the present disclosure (e.g., the sixth FR lactide monomer 602 of FIG. 6A) is incorporated into the lactide polymer backbone. In other cases, the sixth FR lactide monomer 602 of FIG. 6A may be blended with one or more additional FR lactide monomers of the present disclosure in order to incorporate more than one flame retardant moiety into a lactide polymer backbone. Other examples of flame retardant lactide monomers are illustrated and further described herein with respect to FIGS. 1A, 2A, 3A, 4A, 5A, 7A, and 8A.

Thus, FIGS. 6A-6D illustrate an example of a process of forming a flame retardant lactide monomer (e.g., a diphosphate lactide monomer) and utilizing the flame retardant lactide monomer to form flame retardant polylactides. The flame retardant polylactides 612, 622, and 634 depicted in FIGS. 6B-6D may be used to form an article of manufacture that satisfies a plastics flammability standard, such as the UL V-0 or V-1 standards. In some cases, an article of manufacture formed from one or more of the flame retardant polylactides 612, 622, and 634 depicted in FIGS. 6B-6D may satisfy the plastics flammability standard. In other cases, the article of manufacture may be formed from a blend that includes one or more of the flame retardant polylactides 612, 622, and 634 depicted in FIGS. 6B-6D and another polymer material. To illustrate, in some cases, one or more of the flame retardant polylactides 612, 622, and 634 depicted in FIGS. 6B-6D may be blended with a polyurethane material, a polycarbonate material, an ABS material, a polyester material, a polyether material, or a combination thereof (among other alternatives). In cases where the blend includes non-renewable polymeric materials, the addition of the flame retardant polylactide(s) may enable the article of manufacture to satisfy a plastics flammability standard while also increasing the biorenewable content of the polymeric material.

Referring to FIG. 7A, a chemical reaction diagram 700 illustrates an example of a process of forming a seventh FR lactide monomer 702 from the first FR lactide monomer 102 of FIG. 1A, according to an embodiment.

The first chemical reaction depicted in FIG. 7A illustrates that, starting from an L-lactide molecule, radical monobromination at the carbon alpha to the carbonyl results in the addition of a flame retardant moiety to the L-lactide molecule, resulting in the first FR lactide monomer 102 of FIG. 1A. The second chemical reaction depicted in FIG. 7A illustrates that elimination with triethylamine ($NEt_3$) results in the formation of a methylidene lactide intermediate material. The third chemical reaction depicted in FIG. 7A illustrates that the seventh FR lactide monomer 702 may be synthesized from the methylidene lactide intermediate material. In a particular embodiment, the seventh FR lactide monomer 702 may be formed from the methylidene lactide intermediate material using bromine ($Br_2$). As a prophetic example, $Br_2$ liquid may be added dropwise to a solution of the methylidene lactide intermediate material in a solvent, such as dichloromethane (DCM), at a temperature of about 0° C. and stirring at room temperature. The reaction may be quenched with a sulfite solution, using a typical extraction workup. Purification may include recrystallization or column chromatography.

Referring to FIG. 7B, a chemical reaction diagram 710 illustrates that the seventh FR lactide monomer 702 of FIG. 7A may be used to form a first FR polylactide 712. In a particular embodiment, synthesis of the first FR polylactide 712 may include the use of Lewis acid conditions, such as heating as a melt with tin(II) octanoate (identified as "$SnOct_2$" in FIG. 7B). In some cases, an article of manufacture that includes the first FR polylactide 712 of FIG. 7B may (due to the incorporation of two flame retardant moieties per repeat unit along the length of the lactide polymer backbone) have flame retardancy characteristics in order to be assigned a UL 94 V-1 classification or a UL 94 V-0 classification.

Referring to FIG. 7C, a chemical reaction diagram 720 illustrates an example of a process of forming a second FR polylactide 722 using the seventh FR lactide monomer 702 of FIG. 7A. FIG. 7C illustrates that an alcohol initiator (e.g., allyl alcohol) and a TBD catalyst may be utilized to form the second FR polylactide 722 which has a terminal crosslinkable (or polymerizable) group. To illustrate, the second FR polylactide 722 includes a terminal vinyl group which may be used in subsequent cross-linking reactions or to synthesize "bottle-brush" polymers, among other alternatives. In some cases, an article of manufacture that includes the second FR polylactide 722 of FIG. 7C may (due to the incorporation of two flame retardant moieties per repeat unit along the length of the lactide polymer backbone) have flame retardancy characteristics in order to be assigned a UL 94 V-1 classification or a UL 94 V-0 classification.

Referring to FIG. 7D, a chemical reaction diagram 730 illustrates an example of a process of forming a third FR polylactide 734 from a blend 732 (identified as "Lactide Feedstock Blend" in FIG. 7D) that includes an unmodified L-lactide monomer and the seventh FR lactide monomer 702 of FIG. 7A. In the example of FIG. 7D, synthesis of the third FR polylactide 734 from the blend 732 includes the use of Lewis acid conditions, such as heating as a melt with tin(II) octanoate.

FIG. 7D illustrates an example in which at least one of the FR lactide monomers of the present disclosure may be incorporated into a lactide polymer backbone by adding desired amount(s) of the FR lactide monomer(s) to a lactide feedstock prior to polymerization. In the particular embodiment depicted in FIG. 7D, the seventh FR lactide monomer 702 of FIG. 2A may be incorporated into the lactide polymer backbone by forming the blend 732. The blend 732 may include a first amount of the "conventional" L-lactide monomer (that does not include one or more FR moieties bonded to the lactide ring) and a second amount of the seventh FR lactide monomer 702 of FIG. 7A. Polymerization of the blend 732 results in particular flame retardancy characteristics being directly imparted to the resulting third FR polylactide 734. In some cases, the flame retardancy characteristics of the third FR polylactide 734 may be "tuned" by varying the composition of the blend 732.

To illustrate, in some cases, having a first relative amount of the seventh FR lactide monomer 702 of FIG. 7A in the blend 732 may be sufficient for an article of manufacture that includes the third FR polylactide 734 of FIG. 7D to be assigned a UL 94 V-1 classification or a UL 94 V-0 classification. In FIG. 7D, the integer n is used to identify a portion of the lactide polymer backbone that corresponds to the L-lactide monomer, and the integer m is used to identify a portion of the lactide polymer backbone that corresponds to the seventh FR lactide monomer 702. FIG. 7D depicts a particular embodiment in which a single flame retardant lactide monomer of the present disclosure (e.g., the seventh FR lactide monomer 702 of FIG. 7A) is incorporated into the lactide polymer backbone. In other cases, the seventh FR lactide monomer 702 of FIG. 7A may be blended with one or more additional FR lactide monomers of the present disclosure in order to incorporate more than one flame retardant moiety into a lactide polymer backbone. Other examples of flame retardant lactide monomers are illustrated and further described herein with respect to FIGS. 1A, 2A, 3A, 4A, 5A, 6A, and 8A.

Thus, FIGS. 7A-7D illustrate an example of a process of forming a flame retardant lactide monomer (e.g., a dibrominated lactide monomer that is different from the dibrominated lactide monomers of FIGS. 4A and 5A) and utilizing the flame retardant lactide monomer to form flame retardant polylactides. In some cases, the flame retardant polylactides 712, 722, and 734 depicted in FIGS. 7B-7D may be used to form an article of manufacture that satisfies a plastics flammability standard, such as the UL V-0 or V-1 standards. In some cases, an article of manufacture formed from one or more of the flame retardant polylactides 712, 722, and 734 depicted in FIGS. 7B-7D may satisfy the plastics flammability standard. In other cases, the article of manufacture may be formed from a blend that includes one or more of the flame retardant polylactides 712, 722, and 734 depicted in FIGS. 7B-7D and another polymer material. To illustrate, in some cases, one or more of the flame retardant polylactides 712, 722, and 734 depicted in FIGS. 7B-7D may be blended with a polyurethane material, a polycarbonate material, an ABS material, a polyester material, a polyether material, or a combination thereof (among other alternatives). In cases where the blend includes non-renewable polymeric materials, the addition of the flame retardant polylactide(s) may enable the article of manufacture to satisfy a plastics flammability standard while also increasing the biorenewable content of the polymeric material.

Referring to FIG. 8A, a chemical reaction diagram 800 illustrates an example of a process of forming an eighth FR lactide monomer 802 from the fourth flame retardant lactide monomer 402 of FIG. 4A, according to an embodiment.

The first chemical reaction depicted in FIG. 8A illustrates that, starting from an L-lactide molecule, radical monobromination at the two carbons alpha to the carbonyl groups results in the addition of two flame retardant moieties to the L-lactide molecule, resulting in the fourth FR lactide monomer 402 of FIG. 4A. The second chemical reaction depicted in FIG. 8A illustrates that elimination with triethylamine ($NEt_3$) results in the formation of a dimethylidene lactide intermediate material. The third chemical reaction depicted in FIG. 8A illustrates that an eighth FR lactide monomer 802 may be synthesized from the dimethylidene lactide intermediate material. In a particular embodiment, the eighth FR lactide monomer 802 may be formed from the dimethylidene lactide intermediate material using bromine ($Br_2$). For example, reaction conditions may be similar to those previously described herein with respect to the first chemical reaction of FIG. 7A, using more bromine equivalents.

Referring to FIG. 8B, a chemical reaction diagram 810 illustrates that the eighth FR lactide monomer 802 of FIG. 8A may be used to form a first FR polylactide 812. In a particular embodiment, synthesis of the first FR polylactide 812 may include the use of Lewis acid conditions, such as heating as a melt with tin(II) octanoate (identified as "$SnOct_2$" in FIG. 8B). In some cases, an article of manufacture that includes the first FR polylactide 812 of FIG. 8B may (due to the incorporation of four flame retardant moieties per repeat unit along the length of the lactide polymer backbone) have flame retardancy characteristics in order to be assigned a UL 94 V-1 classification or a UL 94 V-0 classification.

Referring to FIG. 8C, a chemical reaction diagram 820 illustrates an example of a process of forming a second FR polylactide 822 using the eighth FR lactide monomer 802 of FIG. 8A. FIG. 8C illustrates that an alcohol initiator (e.g., allyl alcohol) and a TBD catalyst may be utilized to form the second FR polylactide 822 which has a terminal cross-linkable (or polymerizable) group. To illustrate, the second FR polylactide 822 includes a terminal vinyl group which may be used in subsequent cross-linking reactions or to synthesize "bottle-brush" polymers, among other alternatives. In some cases, an article of manufacture that includes the second FR polylactide 822 of FIG. 8C may (due to the incorporation of four flame retardant moieties per repeat unit along the length of the lactide polymer backbone) have flame retardancy characteristics in order to be assigned a UL 94 V-1 classification or a UL 94 V-0 classification.

Referring to FIG. 8D, a chemical reaction diagram 830 illustrates an example of a process of forming a third FR polylactide 834 from a blend 832 (identified as "Lactide Feedstock Blend" in FIG. 8D) that includes an unmodified L-lactide monomer and the eighth FR lactide monomer 802 of FIG. 8A. In the example of FIG. 8D, synthesis of the third FR polylactide 834 from the blend 832 includes the use of Lewis acid conditions, such as heating as a melt with tin(II) octanoate.

FIG. 8D illustrates that one of one or more of the FR lactide monomers of the present disclosure may be incorporated into a lactide polymer backbone by adding desired amount(s) of the FR lactide monomer(s) into the blend 832 (that includes an unmodified L-lactide monomer). In the particular embodiment depicted in FIG. 8D, the eighth FR lactide monomer 802 of FIG. 8A may be incorporated into a lactide polymer backbone by forming the blend 832. The blend 832 may include a first amount of the "conventional" L-lactide monomer (that does not include one or more FR moieties bonded to the lactide ring) and a second amount of the eighth FR lactide monomer 802 of FIG. 8A.

To illustrate, in some cases, having a first relative amount of the eighth FR lactide monomer 802 of FIG. 8A in the blend 832 may be sufficient for an article of manufacture that includes the third FR polylactide 834 of FIG. 8D to be assigned a UL 94 V-1 classification or a UL 94 V-0 classification. In FIG. 8D, the integer n is used to identify a portion of the lactide polymer backbone that corresponds to the L-lactide monomer, and the integer m is used to identify a portion of the lactide polymer backbone that corresponds to the eighth FR lactide monomer 802. FIG. 8D depicts a particular embodiment in which a single flame retardant lactide monomer of the present disclosure (e.g., the eighth FR lactide monomer 802 of FIG. 8A) is incorporated into the lactide polymer backbone. In other cases, the eighth FR lactide monomer 802 of FIG. 8A may be blended with one or more additional FR lactide monomers of the present disclosure in order to incorporate more than one flame retardant moiety into a lactide polymer backbone. Other examples of flame retardant lactide monomers are illustrated and further described herein with respect to FIGS. 1A, 2A, 3A, 4A, 5A, 6A, and 7A.

Thus, FIGS. 8A-8D illustrate an example of a process of forming a flame retardant lactide monomer (e.g., a tetrabrominated lactide monomer) and utilizing the flame retardant lactide monomer to form flame retardant polylactides. In some cases, the flame retardant polylactides 812, 822, and 834 depicted in FIGS. 8B-8D may be used to form an article of manufacture that satisfies a plastics flammability standard, such as the UL V-0 or V-1 standards. In some cases, an article of manufacture formed from one or more of the flame retardant polylactides 812, 822, and 834 depicted in FIGS. 8B-8D may satisfy the plastics flammability standard. In other cases, the article of manufacture may be formed from a blend that includes one or more of the flame retardant polylactides 812, 822, and 834 depicted in FIGS. 8B-8D and another polymer material. To illustrate, in some cases, one or more of the flame retardant polylactides 812, 822, and 834 depicted in FIGS. 8B-8D may be blended with a polyurethane material, a polycarbonate material, an ABS material, a polyester material, a polyether material, or a combination thereof (among other alternatives). In cases where the blend includes non-renewable polymeric materials, the addition of the flame retardant polylactide(s) may enable the article of manufacture to satisfy a plastics flammability standard while also increasing the biorenewable content of the polymeric material.

Figure 9:
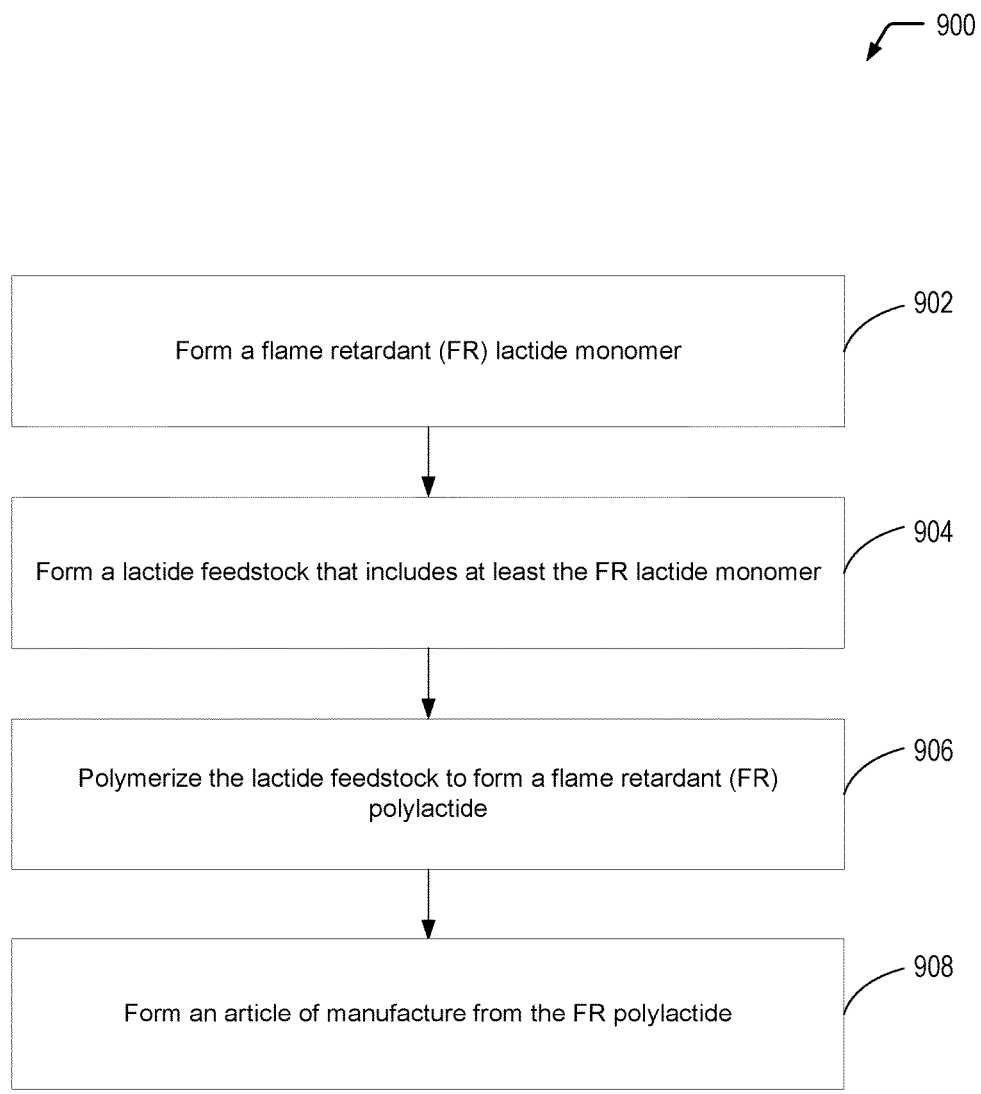
FIG. 9 is a flow diagram depicting a particular embodiment of a process of forming a flame retardant polylactide from a flame retardant lactide monomer.

Referring to FIG. 9, a flow diagram illustrates an example of a process 900 of forming a flame retardant polylactide from a flame retardant lactide monomer, according to one embodiment. In the particular embodiment depicted in FIG. 9, the process 900 further includes forming an article of manufacture from the FR polylactide. It will be appreciated that the operations shown in FIG. 9 are for illustrative purposes only and that the operations may be performed in alternative orders, at alternative times, by a single entity or by multiple entities, or a combination thereof. For example, one entity may form the FR lactide monomer (operation 902 in the example of FIG. 9), while another entity may utilize the FR lactide monomer to form a FR polylactide (operations 904 and 906 in the example of FIG. 9). Additionally, another entity may utilize the FR polylactide to form an article of manufacture (operation 908 in the example of FIG. 9).

The process 900 includes forming a flame retardant lactide monomer, at 902. For example, the flame retardant lactide monomer may correspond to the first FR lactide monomer 102 of FIG. 1A, the second FR lactide monomer 202 of FIG. 2A, the third FR lactide monomer 302 of FIG. 3A, the fourth FR lactide monomer 402 of FIG. 4A, the fifth FR lactide monomer 502 of FIG. 5A, the sixth FR lactide monomer 602 of FIG. 6A, the seventh FR lactide monomer 702 of FIG. 7A, the eighth FR lactide monomer 802 of FIG. 8A, or any combination thereof. The flame retardant lactide monomer may be formed according to one of the processes previously described herein.

The process 900 also includes forming a lactide feedstock that includes at least the flame retardant lactide monomer, at 904. The process 900 further includes polymerizing the lactide feedstock to form a flame retardant polylactide, at 906.

For example, referring to FIGS. 1A-1C, the first FR lactide monomer 104 may be utilized to form the first FR polylactide 104 of FIG. 1A, the second FR polylactide 112 of FIG. 1B, or the third FR polylactide 124 of FIG. 1C. In the case of the third FR polylactide 124 of FIG. 1C, the lactide feedstock corresponds to the blend 122 that includes a first amount of an L-lactide monomer and a second amount of the first FR lactide monomer 102.

As another example, referring to FIGS. 2B-2D, the second FR lactide monomer 202 of FIG. 2A may be utilized to form the first FR polylactide 212 of FIG. 2B, the second FR polylactide 222 of FIG. 2C, or the third FR polylactide 234 of FIG. 2D. In the case of the third FR polylactide 234 of FIG. 2D, the lactide feedstock corresponds to the blend 232 that includes a first amount of an L-lactide monomer and a second amount of the second FR lactide monomer 202.

As another example, referring to FIGS. 3B-3D, the third FR lactide monomer 302 of FIG. 3A may be utilized to form the first FR polylactide 312 of FIG. 3B, the second FR polylactide 322 of FIG. 3C, or the third FR polylactide 334 of FIG. 3D. In the case of the third FR polylactide 334 of FIG. 3D, the lactide feedstock corresponds to the blend 332 that includes a first amount of an L-lactide monomer and a second amount of the third FR lactide monomer 302.

As another example, referring to FIGS. 4B-4D, the fourth FR lactide monomer 402 of FIG. 4A may be utilized to form the first FR polylactide 412 of FIG. 4B, the second FR polylactide 422 of FIG. 4C, or the third FR polylactide 434 of FIG. 4D. In the case of the third FR polylactide 434 of FIG. 4D, the lactide feedstock corresponds to the blend 432 that includes a first amount of an L-lactide monomer and a second amount of the fourth FR lactide monomer 402.

As another example, referring to FIGS. 5B-5D, the fifth FR lactide monomer 502 of FIG. 5A may be utilized to form the first FR polylactide 512 of FIG. 5B, the second FR polylactide 522 of FIG. 5C, or the third FR polylactide 534 of FIG. 5D. In the case of the third FR polylactide 534 of FIG. 5D, the lactide feedstock corresponds to the blend 532 that includes a first amount of an L-lactide monomer and a second amount of the fifth FR lactide monomer 502.

As another example, referring to FIGS. 6B-6D, the sixth FR lactide monomer 602 of FIG. 6A may be utilized to form the first FR polylactide 612 of FIG. 6B, the second FR polylactide 622 of FIG. 6C, or the third FR polylactide 634 of FIG. 6D. In the case of the third FR polylactide 634 of FIG. 6D, the lactide feedstock corresponds to the blend 632 that includes a first amount of an L-lactide monomer and a second amount of the sixth FR lactide monomer 602.

As a further example, referring to FIGS. 7B-7D, the seventh FR lactide monomer 702 of FIG. 7A may be utilized to form the first FR polylactide 712 of FIG. 7B, the second FR polylactide 722 of FIG. 7C, or the third FR polylactide 734 of FIG. 7D. In the case of the third FR polylactide 734 of FIG. 7D, the lactide feedstock corresponds to the blend 732 that includes a first amount of an L-lactide monomer and a second amount of the seventh FR lactide monomer 702.

As yet another example, referring to FIGS. 8B-8D, the eighth FR lactide monomer 802 of FIG. 8A may be utilized to form the first FR polylactide 812 of FIG. 8B, the second FR polylactide 822 of FIG. 8C, or the third FR polylactide 834 of FIG. 8D. In the case of the third FR polylactide 834 of FIG. 8D, the lactide feedstock corresponds to the blend 832 that includes a first amount of an L-lactide monomer and a second amount of the eighth FR lactide monomer 802.

In the particular embodiment depicted in FIG. 9, the process 900 further includes forming an article of manufacture from the flame retardant polylactide, at 908. In some cases, one or more of the FR polylactides of the present disclosure may be blended with a polymeric material, and the article of manufacture may be formed from the blend. In a particular embodiment, the article of manufacture may have flame retardancy characteristics that are sufficient to satisfy a particular plastics flammability standard (e.g., a UL 94 V-0/V-1 plastics flammability standard). To illustrate, in some cases, one or more of the flame retardant polylactides of the present disclosure may be blended with a polyurethane material, a polycarbonate material, an ABS material, a polyester material, a polyether material, or a combination thereof (among other alternatives).

Thus, FIG. 9 illustrates an example of a process of forming a flame retardant polylactide from a flame retardant lactide monomer. The FR lactide monomers of the present disclosure may be incorporated into a lactide polymer backbone by adding a desired amount of a particular FR lactide monomer (or a combination of multiple FR lactide monomers of the present disclosure) into a lactide feedstock. The addition of FR groups to lactide monomers prior to polymerization may result in particular flame retardancy characteristics being directly imparted to the resulting polylactides by incorporating the FR groups along a length of the lactide polymer backbone. In some cases, the FR polylactides of the present disclosure may represent the major component of a desired material or may be blended with other material(s) to adjust the flammability resistance of the material (e.g., in order to satisfy a plastics flammability standard).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process of forming a flame retardant polylactide, the process comprising:
   forming a flame retardant lactide monomer, wherein the flame retardant lactide monomer includes at least one bromide group;
   forming a lactide feedstock that includes at least the flame retardant lactide monomer; and
   polymerizing the lactide feedstock to form a flame retardant polylactide.

2. The process of claim 1, wherein the flame retardant lactide monomer includes a monobrominated lactide monomer.

3. The process of claim 1, wherein the flame retardant lactide monomer includes a dibrominated lactide monomer.

4. The process of claim 1, wherein the flame retardant lactide monomer includes a tetrabrominated lactide monomer.

5. The process of claim 1, wherein the lactide feedstock includes an alcohol initiator, and wherein the flame retardant polylactide includes a terminal vinyl group.

6. The process of claim 5, wherein the alcohol initiator includes allyl alcohol.

7. The process of claim 1, wherein the lactide feedstock includes a blend, the blend including a first amount of an L-lactide monomer and a second amount of the flame retardant lactide monomer.

8. The process of claim 1, further comprising utilizing the flame retardant polylactide to form an article of manufacture having flame retardancy characteristics that satisfy a plastics flammability standard.

9. The process of claim 8, wherein the plastics flammability standard includes a burning stop rate of less than 30 seconds on a vertical specimen.

10. The process of claim 8, wherein the plastics flammability standard includes a burning stop rate of less than 10 seconds on a vertical specimen.

11. The process of claim 8, wherein the plastics flammability standard allows drips of non-inflamed particles, and wherein the plastics flammability standard does not allow drips of flaming particles.

12. The process of claim 8, wherein the article of manufacture is formed from a blend that includes the flame retardant polylactide and a second polymeric material, the second polymeric material including a polyurethane material, a polycarbonate material, an acrylonitrile butadiene styrene (ABS) material, a polyester material, a polyether material, or a combination thereof.

13. A flame retardant polylactide formed by a process comprising:
   forming a lactide feedstock that includes at least a flame retardant lactide monomer, wherein the flame retardant lactide monomer includes at least one bromide group; and
   polymerizing the lactide feedstock to form the flame retardant polylactide.

14. The flame retardant polylactide of claim 13, wherein the process further comprises forming the flame retardant lactide monomer from an L-lactide molecule or a derivative thereof.

15. The flame retardant polylactide of claim 13, wherein the lactide feedstock includes a blend, the blend including a first amount of an L-lactide monomer and a second amount of the flame retardant lactide monomer.

16. An article of manufacture formed by a process comprising:
   forming a lactide feedstock that includes a first amount of an L-lactide monomer and a second amount of a flame retardant lactide monomer, wherein the flame retardant lactide monomer includes at least one bromide group;
   polymerizing the lactide feedstock to form a flame retardant polylactide;
   forming a blend that includes the flame retardant polylactide and a second polymeric material; and
   forming an article of manufacture from the blend, wherein the second amount of the flame retardant lactide monomer in the lactide feedstock is selected such that the article of manufacture has flame retardancy characteristics that satisfy a plastics flammability standard.

17. The process of claim 16, wherein the second polymeric material including a polyurethane material, a polycarbonate material, an acrylonitrile butadiene styrene (ABS) material, a polyester material, a polyether material, or a combination thereof.

* * * * *